(12) United States Patent
Stadie et al.

(10) Patent No.: US 12,709,480 B2
(45) Date of Patent: Aug. 18, 2026

(54) APPARATUS AND METHOD FOR CHARGING A LOAD HANDLING DEVICE

(71) Applicant: Ocado Innovation Limited, Hatfield (GB)

(72) Inventors: Robert Stadie, Hatfield (GB); Keith Habben, Hatfield (GB)

(73) Assignee: Ocado Innovation Limited, Hatfield (GB)

( * ) Notice: Subject to any disclaimer, the term of this patent is extended or adjusted under 35 U.S.C. 154(b) by 968 days.

(21) Appl. No.: 17/759,469

(22) PCT Filed: Jan. 26, 2021

(86) PCT No.: PCT/EP2021/051771

§ 371 (c)(1),
(2) Date: Jul. 26, 2022

(87) PCT Pub. No.: WO2021/151902

PCT Pub. Date: Aug. 5, 2021

(65) Prior Publication Data

US 2023/0059131 A1 Feb. 23, 2023

(30) Foreign Application Priority Data

Jan. 27, 2020 (GB) .................................... 2001108
Jul. 10, 2020 (GB) .................................... 2010702

(51) Int. Cl.
*G06F 7/00* (2006.01)
*B65G 1/137* (2006.01)

(52) U.S. Cl.
CPC ................................ *B65G 1/1375* (2013.01)

(58) Field of Classification Search
CPC .. B65G 1/1375; B65G 1/0478; B65G 1/0464; B65G 1/0492; B65G 1/065;
(Continued)

(56) References Cited

U.S. PATENT DOCUMENTS 5,909,100 A 6/1999 Watanabe et al.
9,840,154 B2 12/2017 Kwa et al.
(Continued)

FOREIGN PATENT DOCUMENTS

CN 110143148 A 8/2019
CN 110588387 A 12/2019
(Continued)

OTHER PUBLICATIONS

Office Action issued on Jul. 25, 2022, by the Great Britain Patent Office in corresponding Great Britain Patent Application No. GB2208486.7. (4 pages).

(Continued)

*Primary Examiner* — Yolanda R Cumbess
(74) *Attorney, Agent, or Firm* — Gregory Matt McCloskey

(57) ABSTRACT

A load handling device for lifting and moving containers stacked in a storage system a grid framework structure, the load handling device including: a vehicle body housing a driving mechanism operatively arranged for moving the load handling device on the grid framework structure; a lifting device having a lifting drive assembly and a grabber device configured to releasably grip a container and lift the container from the stack into a container-receiving space; are chargeable power source electrically coupled to an electrical charge point for electrically coupling to a charge head of a charge station wherein; the electrical charge point includes a charge collector connectable to the charge head of the charge station under action of a magnet.

22 Claims, 15 Drawing Sheets

(58) Field of Classification Search

CPC ......... B65G 1/1373; B65G 2201/0235; B65G 1/00; B65G 1/02; B65G 1/026; B65G 1/04; B65G 1/0428; B65G 1/0457; B65G 1/0471; B65G 1/06; B65G 1/12; B65G 1/137; B65G 1/1371; B65G 2203/00; B65G 2209/00; B60L 2200/44; B60L 2260/32; B60L 53/00; B60L 53/126; B60L 53/10–12; B60L 53/14–16; B60L 53/30–31; B60L 53/35–36; B60L 53/39; B60L 53/50; B60L 53/53; B60L 55/00; B60L 2200/26; H01R 13/6205; Y02P 90/60; Y02T 10/70; Y02T 10/7072; Y02T 90/12; Y02T 90/14; G06Q 10/08

USPC .......................................... 700/213–214, 218

See application file for complete search history.

(56) References Cited

U.S. PATENT DOCUMENTS

| | | | | |
|---|---|---|---|---|
| 11,465,521 | B2 * | 10/2022 | Austrheim | B65G 1/0492 |
| 2010/0101879 | A1 * | 4/2010 | McVickers | B60T 1/10 310/156.43 |
| 2014/0091757 | A1 | 4/2014 | Proebstle et al. | |
| 2015/0270729 | A1 | 9/2015 | Isobe | |
| 2015/0336677 | A1 | 11/2015 | Smaoui et al. | |
| 2017/0217324 | A1 | 8/2017 | Buehs et al. | |
| 2018/0152031 | A1 | 5/2018 | Zhai et al. | |
| 2018/0370377 | A1 | 12/2018 | Blacksberg et al. | |
| 2019/0054932 | A1 | 2/2019 | Stadie et al. | |
| 2019/0092184 | A1 * | 3/2019 | Sussman | G05D 1/0225 |
| 2020/0067329 | A1 | 2/2020 | Liu et al. | |
| 2020/0205630 | A1 | 7/2020 | Mai et al. | |
| 2021/0086802 | A1 | 3/2021 | Stadie et al. | |

FOREIGN PATENT DOCUMENTS

| | | | | |
|---|---|---|---|---|
| CN | 110649671 | A | 1/2020 | |
| EP | 2923880 | A2 * | 9/2015 | H02J 7/0042 |
| EP | 3471213 | A1 | 4/2019 | |
| JP | H04275001 | A | 9/1992 | |
| JP | H0731009 | A | 1/1995 | |
| JP | H10112354 | A | 4/1998 | |
| JP | 2011193616 | A | 9/2011 | |
| JP | 2015186319 | A | 10/2015 | |
| KR | 20180132779 | A | 12/2018 | |
| WO | 2015019055 | A1 | 2/2015 | |
| WO | 2015185628 | A2 | 12/2015 | |
| WO | 2017148939 | A1 | 9/2017 | |
| WO | 2019053676 | A1 | 3/2019 | |
| WO | 2019092029 | A1 | 5/2019 | |
| WO | WO-2019118350 | A1 * | 6/2019 | B60L 53/35 |
| WO | 2019215221 | A1 | 11/2019 | |
| WO | WO-2019238702 | A1 * | 12/2019 | B60L 53/16 |

OTHER PUBLICATIONS

Office Action (Communication) issued on Jul. 2, 2024, by the European Patent Office in corresponding European Patent Application No. 21 702 228.4. (6 pages).

Combined Search and Examination Report Letter in corresponding Application No. GB2001108.6 dated Jan. 27, 2022.

Combined Search and Examination Report Letter in corresponding Application No. GB2101060.8 dated Jan. 27, 2022.

Combined Search and Examination Report under Sections 17 & 18(3) in corresponding Application No. GB2001108.6 dated Jan. 27, 2022.

Combined Search and Examination Report under Sections 17 and 18(3) in corresponding Application No. GB2101060.8 dated Jan. 27, 2022.

International Search Report (PCT/ISA/210) and Written Opinion (PCT/ISA/237) mailed on Apr. 26, 2021, by the European Patent Office as the International Searching Authority for International Application No. PCT/EP2021/051771.

Search Report under Sections 17 in corresponding Application No. GB2001108.6 dated Jul. 6, 2020.

Search Report under Sections 17 Letter in corresponding Application No. GB2101060.8 dated Jul. 8, 2021.

Office Action (Examination Report No. 2) issued on Mar. 26, 2024, by the Australian Patent Office in corresponding Australian Patent Application No. 2021213892. (5 pages).

Office Action issued on Jan. 8, 2025 by the Korean Patent Office in corresponding Korean Application No. 10-2022-7029615 (10 pages) corresponding to Applicant's U.S. Appl. No. 17/759,469.

Office Action issued on Jan. 16, 2025 by the Canadian Patent Office in corresponding Canadian Application No. 3,169,258 (6 pages) corresponding to Applicant's U.S. Appl. No. 17/759,469.

Office Action issued on Apr. 30, 2025 by the Chinese Patent Office in corresponding Chinese Application No. 202180024744.5 (10 pages) corresponding to Applicant's U.S. Appl. No. 17/759,469.

Final Office Action issued on May 14, 2024, by the Japanese Patent Office in corresponding Japanese Patent Application No. 2022-545824, and an English Translation of the Office Action. (6 pages).

Office Action (Examination Report No. 1) issued on Aug. 24, 2023, by the Australian Patent Office in corresponding Australian Patent Application No. 2021213892. (4 pages).

First Office Action issued on Oct. 3, 2023, by the Japanese Patent Office in corresponding Japanese Patent Application No. 2022-545824, and an English Translation of the Office Action. (9 pages).

Office Action issued on Oct. 13, 2023, by the Canadian Patent Office in corresponding Canadian Patent Application No. 3,169,258. (5 pages).

Examination Report issued on Oct. 6, 2025 by the Australian Patent Office in corresponding Australian Application No. 2024219456 (4 pages) corresponding to Applicant's U.S. Appl. No. 17/759,469.

Office Action issued on Dec. 25, 2025 by the Chinese Patent Office in corresponding Chinese Application No. 202180024744.5 (14 pages) corresponding to Applicant's U.S. Appl. No. 17/759,469.

Examination Report issued on Feb. 12, 2026 by the European Patent Office in corresponding European Application No. 21702228.4 (6 pages) corresponding to Applicant's U.S. Appl. No. 17/759,469.

* cited by examiner

APPARATUS AND METHOD FOR CHARGING A LOAD HANDLING DEVICE

TECHNICAL FIELD

The present invention relates to the field of load handling devices for handling storage containers or bins in a storage system comprising a grid of stacked containers, more specifically to an apparatus and method for charging a load handling device.

BACKGROUND

Storage systems comprising a three-dimensional storage grid structure, within which storage containers/bins are stacked on top of each other, are well known. PCT Publication No. WO2015/185628A (Ocado) describes a known storage and fulfilment system in which stacks of bins or containers are arranged within a grid framework structure. The bins or containers are accessed by load handling devices operative on tracks located on the top of the grid framework structure. A storage system 1 of this type is illustrated schematically in FIGS. 1 to 3 of the accompanying drawings.

As shown in FIGS. 1 and 2, stackable containers, known as bins 10, are stacked on top of one another to form stacks 12. The stacks 12 are arranged in a grid framework structure 14 in a warehousing or manufacturing environment. The grid framework structure 14 is made up of a plurality of storage columns or grid columns. Each grid in the grid framework structure 14 has at least one grid column for storage of a stack of containers. FIG. 1 is a schematic perspective view of the grid framework structure 14, and FIG. 2 is a top-down view showing a stack 12 of bins 10 arranged within the framework structure 14. Each bin 10 typically holds a plurality of product items (not shown), and the product items within a bin 10 may be identical, or may be of different product types depending on the application.

The grid framework structure 14 comprises a plurality of upright members 16 that support horizontal members 18, 20. A first set of parallel horizontal members 18 is arranged perpendicularly to a second set of parallel horizontal members 20 to form a plurality of horizontal grid structures supported by the upright members 16. The members 16, 18, 20 are typically manufactured from metal. The bins 10 are stacked between the members 16, 18, 20 of the grid framework structure 14, so that the grid framework structure 14 guards against horizontal movement of the stacks 12 of bins 10, and guides vertical movement of the bins 10.

The top level of the grid framework structure 14 includes rails 22 arranged in a grid pattern across the top of the stacks 12. Referring additionally to FIG. 3, the rails 22 support a plurality of load handling devices 30. A first set 22*a* of parallel rails 22 guide movement of the robotic load handling devices 30 in a first direction (for example, an X-direction) across the top of the grid framework structure 14, and a second set 22*b* of parallel rails 22, arranged perpendicular to the first set 22*a*, guide movement of the load handling devices 30 in a second direction (for example, a Y-direction), perpendicular to the first direction. In this way, the rails 22 allow movement of the robotic load handling devices 30 laterally in two dimensions in the horizontal X-Y plane, so that a load handling device 30 can be moved into position above any of the stacks 12.

A known load handling device 30 shown in FIGS. 4 and 5 comprising a vehicle body 32 is described in PCT Patent Publication No. WO2015/019055 (Ocado), hereby incorporated by reference, where each load handling device 30 only covers one grid space of the grid framework structure 14. Here, the load handling device 30 comprises a wheel assembly comprising a first set of wheels 34 consisting a pair of wheels on the front of the vehicle body 32 and a pair of wheels 34 on the back of the vehicle 32 for engaging with the first set of rails or tracks to guide movement of the device in a first direction and a second set of wheels 36 consisting of a pair of wheels 36 on each side of the vehicle 32 for engaging with the second set of rails or tracks to guide movement of the device in a second direction. Each of the set wheels are driven to enable movement of the vehicle in X and Y directions respectively along the rails. One or both sets of wheels can be moved vertically to lift each set of wheels clear of the respective rails, thereby allowing the vehicle to move in the desired direction.

The load handling device 30 is equipped with a lifting device or crane mechanism to lift a storage container from above. The crane mechanism comprises a winch tether or cable 38 wound on a spool or reel (not shown) and a grabber device 39. The lifting device comprise a set of lifting tethers 38 extending in a vertical direction and connected nearby or at the four corners of a lifting frame 39, otherwise known as a grabber device (one tether near each of the four corners of the grabber device) for releasable connection to a storage container 10. The grabber device 39 is configured to releasably grip the top of a storage container 10 to lift it from a stack of containers in a storage system of the type shown in FIGS. 1 and 2.

The wheels 34, 36 are arranged around the periphery of a cavity or recess, known as a container-receiving recess 40, in the lower part. The recess is sized to accommodate the container 10 when it is lifted by the crane mechanism, as shown in FIG. 5 (a and b). When in the recess, the container is lifted clear of the rails beneath, so that the vehicle can move laterally to a different location. On reaching the target location, for example another stack, an access point in the storage system or a conveyor belt, the bin or container can be lowered from the container receiving portion and released from the grabber device.

Although not shown in FIGS. 1-3, the load handling device 30 is powered during operation by an on-broad rechargeable battery. Examples of rechargeable batteries are Lithium-Ion battery, Nickel-Cadmium battery, Nickel-Metal Hydride battery, Lithium-Ion Polymer battery, Thin Film battery and Smart battery Carbon Foam-based Lead Acid battery. The battery is recharged while the load handling device 30 is operative on the grid framework structure 14 by a charge station 50 shown in FIG. 6. The charge station 50 typically has an L shaped structure that is fixed proximate to the grid framework structure and extends over a nominal grid cell at an edge of the grid structure. The charge station 50 comprises a charge head 52 comprising charge contacts which are fixed in position relative to the charge station 50. The charge head is mounted to one arm 54 of the L shaped structure such that the charge head 52 is suspended over at least two grid spaces of the grid framework. A load handling device may be charged by being instructed to move to a grid cell above which the charge head 52 is located. As the load handling device moves into the grid cell, a contact is made between a charge contact pad on a top surface of the load handling device, and the charge contacts of the charge head. A charge is imparted to the load handling device from the charge contacts through the charge contact pad situated on the top surface of the load handling device.

However, a number of problems exist with the charge station. In particular, due to the movement of the robotic load handling device into the charge station, a clamping force exists between the charge contacts and the robotic load handling device. However, the magnitude of this force can cause problems to arise over a period of time. For example, repeated entries of the robotic load handling device into the grid cell above which the charge station is located causes a fatiguing of the charge station which will then require maintenance or replacement of the charge head and supporting structure. Moreover, vibration of the grid framework structure caused by movement of the robotic load handling devices negatively affects the alignment between the charge contacts of the charge station and the robotic load handling device. Moreover, grid cell damage, wear and material creep causes alignment issues between the charge contacts and the charge pad contacts, negatively affecting the ability of the robotic load handling device to make contact with the charge contacts. Similarly, tolerances in both the manufacture of the grid framework structure and charge station and/or slight variation in installation alignment of the grid framework structure with respect to the charge station and/or thermal expansion of the grid framework structure with respect to the charge station can also cause alignment issues which negatively affect the ability of the robotic load handling device to make contact with the charge contacts. Moreover, the charge contacts wear with time and therefore, require periodic servicing or repair. However, the maintenance of the charge contacts requires human intervention on the top of the grid framework structure which can only be performed if the robotic load handling devices on top of the grid framework structure are in a "safe mode" rendering them inoperable. The downtime as a result of the load handling device being idle leads to a loss of production of the whole system.

WO2019/215221 (Ocado Innovation Limited) addresses this problem by providing a charge station in which a charge head is drawn towards the charge pad on the top surface of the load handling device. The charge unit 56 (see FIGS. 7*a* and 7*b*) comprises a plurality of profiled sections 58, 60 arranged to interface with a hoist element 70 of the load handling device 30 (see FIG. 8) and a power transfer component 62 arranged to transfer power to the load handling device when the hoist element 70 engages with the plurality of profiled sections 58, 60. FIG. 8 shows a hoist element 70 located at the top of the load handling device used for manual movement of the load handling device 30. The hoist element 70 comprises a cutaway below a bulbous head which gives rise to an underside 72. The hoist element 70 is so designed to permit the attachment of a hoist to lift the load handling device 30 from a grid cell. The power transfer component 62 is typically composed of copper and outwardly biased by a resilient member, e.g. a spring, so as to lessen the impact of the power transfer unit 62 making contact with a charge pad 74 on the top surface 76 of the handling device 30. In addition to the power transfer unit 62, a cartridge 56 comprises a plurality of charge contacts 63 on its underside. Like the power transfer unit 62, the plurality of charge contacts 63 are outwardly biased by a resilient member, e.g. a spring, so as to lessen the impact of the charge contacts 63 making contact with the charge pad 74 on the top surface 76 of the handling device 30. In contrast to the power transfer units 62, the additional charge contacts may be for the purpose of preventing arcing between the power transfer units or for data transfer during charging.

The plurality of profiled sections 58, 60 and the power transfer unit 62 are arranged in the moveable cartridge 56 such that contact between the hoist element 70 and the plurality of profiled sections 58, 60 causes movement of the cartridge 56 towards the load handling device 30. Thereby the amount of clamping force of the cartridge 56 can be controlled, in particular the clamping force on the power transfer unit 62 with the charge pad 74 at the top surface of the load handling device. Together with the resiliently biased power transfer units 62 and/or the plurality of resiliently biased charge contacts 74, damage/wear to the cartridge and/or the top surface of the robotic load handling device is minimised.

However, the increased number of components of the cartridge taught by WO2019/215221 (Ocado Innovation Limited) such as the plurality of profiled sections not only increases the complexity of the charge station but also renders the charging station costly to service, should any one of the components require repairing or to be replaced. Furthermore, the need to suspend the cartridge above the load handling device presents potential alignment issues between the charge contacts of the cartridge and the hoist element of the load handling device. In an extreme case, this can lead to improper seating of the hoist element with the profiled sections of the charge unit, resulting in improper electrical coupling between the charge contacts on the top surface of the load handling device and the cartridge of the charging station resulting in either inadequate or prolonged charging of the battery. Another consideration where misalignment of the robotic load handling device with the charge station can negatively impact the proper operation of the robotic load handling device is the risk of arcing between the power transfer components of the charge station and the charge contacts of the load handling device. Whilst the charge pads are resiliently mounted, there still exists an insufficient clamping force between the charge head and the charge contacts, leading to potential arcing between their corresponding contact surfaces and ultimately damage to the contact surfaces.

In WO2019/238702 (Autostore Technology AS) the charge receiving element for charging the battery is mounted to the underside of a container vehicle or load handling device and is arranged to electrically couple with charge providing elements of a charge station located within a single grid cell at a level below the rails on the grid framework structure. In operation, the container vehicle is moved into position above the charging station such that the charge receiving elements on the underside of the container vehicle is directly above the charge providing elements of the charge station within a grid cell; more specifically their corresponding contact surfaces are directly facing each other. Electrical contact or coupling is achieved by lowering the container vehicle vertically towards the rail grid, e.g. by vertically displacing a set of wheels of the container vehicle, such that the corresponding contact surfaces of the charge receiving elements and the charge providing elements mate. Lowering of the container vehicle towards the rail grid pushes the contact surfaces of the charge receiving elements to mate against the contact surfaces of the charge providing elements of the charge station. The charge receiving elements or the charge providing elements may be connected to a resilient assembly to bias the charge receiving elements or the charge providing elements in a vertical direction. Whilst integrating the charge station within a single grid cell of the grid framework and at a level below the rails of the rail grid, allows the charging station to be arranged anywhere on the rail grid without preventing movement of the container vehicle. WO2019/238702 (Autostore Technology AS) is very much restricted to the container vehicle being equipped with a crane device that comprises a cantilever arm that extends laterally from the top of the vehicle to accommodate a container receiving space, i.e. the container is accommodated beneath the cantilever arm and is held above the level of the rails. Equally, the vehicle needs to be sufficiently heavy to counterbalance the weight of a container and to remain stable during a lifting process. Without the cantilever arm, the load handling device cannot accommodate a container within the vehicle body. As a result, the container vehicle including the container receiving space has a footprint that extends over at least two grid cells.

A charging station is thus required that:

i) has a footprint that does not occupy more than a single grid space or cell of a grid framework structure, ii) is easy to manufacture comprising fewer moving parts, iii) is able to accommodate different heights of the load handling device, iv) does not suffer from alignment issues between the contact pads of the charge head and the charge receiving pads of the load handling device.

It is against this background that the present invention has been devised.

This application claims priority from UK Patent Application Nos. GB2001108.6 filed 27 Jan. 2020 and GB2010702.5 filed 10 Jul. 2020, the content of these applications hereby being incorporated by reference.

SUMMARY OF INVENTION

The present applicant has mitigated the above problem by providing a load handling device for lifting and moving containers stacked in a storage system comprising a grid framework structure comprising a pathway arranged in a grid pattern above the stacks of containers, the load handling device comprising:

a vehicle body housing a driving mechanism operatively arranged for moving the load handling device on the grid framework;

a lifting device comprising a lifting drive assembly and a grabber device configured, in use, to releasably grip a container and lift the container from the stack into a container-receiving space, said driving mechanism and the lifting drive assembly are powered by a rechargeable power source electrically coupled to an electrical charge point arranged on the vehicle body for electrically coupling to a charge head of a charge station in use;

characterised in that;

the electrical charge point comprises a charge collector connectable to the charge head of the charge station under action of a magnet.

For the purpose of this patent specification, the storage system for the storage of goods, retrieval, processing and/or fulfilment of orders, wherein access to such goods is provided by fully or semi-automatic retrieval by the load handling devices, is referred to as a grid framework structure or "hive". The grid framework structure or "hive" provides pathways in the form of a grid-layout for the movement of the load handling devices to traverse and perform operations at various location in the "hive". Preferably, the rechargeable power source may be a battery or a capacitor. The charge station is connected to a suitable power source charger, preferably a DC power source charger. For example, the power source charger comprises a rectifier to convert AC current to DC current. For the purpose of the patent specification, the phrase "under the action of a magnet" covers both magnetic attractive forces and/or magnetic repulsive forces through use of either a permanent magnet or an electromagnet.

Optionally, the vehicle body houses the lifting device comprising the lifting drive assembly and the grabber device such that the grabber device is configured, in use, to releasably grip a container and lift the container from a stack in the framework into a container-receiving space. The container receiving space may comprise a cavity or recess arranged within the vehicle body, e.g. as described in WO 2015/019055 (Ocado Innovation Limited). Alternatively, the vehicle body of the load handling device may comprise a cantilever as taught in WO2019/238702 (Autostore Technology AS) in which case the container receiving space is located below a cantilever of the load handing device. In this case, the grabber device is hoisted by a cantilever such that the grabber device is able to engage and lift a container from a stack into a container receiving space below the cantilever.

Optionally, the vehicle body houses the rechargeable power source. Optionally, the pathway comprises a plurality of rails or tracks. More specifically, a first set of tracks extending in a first direction and a second set of tracks extending in a second direction, the first direction being substantially perpendicular to the second direction so that the plurality of rails or tracks are arranged in a grid pattern.

The electrical charge point comprises a charge collector that is configured to be physically connectable to the charge head of the charge station under the action of a magnet Preferably, the charge collector comprises at least two charge-receiving pads arranged to be connectable to at least two charge-providing pads of the charge head. According to the present invention, the least two charge-receiving pads are arranged to be pushed or pulled against the respective at least two charge-providing pads of the charge head by a magnetic attractive force. In one aspect of the present invention, the charge head is arranged to contact the charge collector under the action of an electromagnet, i.e. the electromagnet is energised to provide a magnetic attractive force. In another aspect of the present invention, the charge head is arranged to contact the charge collector under the action of one or more permanent magnets.

Conversely, the least two charge-receiving pads are arranged to disconnect from the respective at least two charge-providing pads of the charge head by a magnetic repulsive force. The use of magnets to guide the charge-receiving pads and the respective charge-providing pads together removes possible alignment issues when physically aligning the pads together, i.e. through the use of a charge head comprising a moveable cartridge having profiled sections arranged to guide and interface with a hoist element as taught in PCT/EP2019/061808 (Ocado Innovation Limited). Additionally, the use of magnets to connect the charge collector with the charge head permits high contact pressure to be established between the charge collector and the charge head and thereby, contributes to low electrical contact resistance by increasing the surface contact area between the charge head and the charge collector. This helps to limit the degradation of the contact surfaces of the contact pads. Preferably, the charge collector comprises one or more permanent magnets. More preferably, the one or more permanent magnets are rare earth magnets. The high magnetic attractive force provided by rare earth magnets contribute to low electrical contact resistance between the at least two charge-receiving pads and the at least two charge-providing pads. An example of a rare earth magnet that has exceptional pull strength in comparison to ferrite magnets is a neodymium magnet.

In an aspect of the present invention, the charge collector is moveable relative to the vehicle body for connecting to the charge head of the charge station under the action of a magnet. Preferably, the charge collector comprises a telescopic element mounted to the vehicle body so as to be extendible from and retractable within an outer housing. More preferably, the charge collector comprises an inner housing receivable within an outer housing, the inner housing is moveable relative to the outer housing in a telescopic manner. The charge receiving pads of the charge collector are mounted to the inner housing. Preferably, the charge collector is extendable to contact the charge head under a magnetic attractive force and is retractable within the outer housing under a magnetic repulsive force. The magnetic repulsive force is provided by incorporating one or more magnets in the charge head to repel the one or more magnets in the charge collector. Optionally, the charge collector is retractable within the outer housing by a resilient member. Optionally, the resilient member is a spring. Such a configuration removes the needs to apply a magnetic repulsive force to retract the charge collector within the outer housing when detaching from the charge head and is, therefore, only extendable to connect to the charge head by a magnetic attractive force.

Preferably, the electrical charge point of the present invention is mounted to an exterior surface at least one wall of the vehicle body. More preferably, the wall is a sidewall of the vehicle body. This makes it possible for the load handling device to dock onto a charge station and the charge collector mate with the charge head under the action of the magnetic attractive force. For example, the load handling device can be manoeuvred to dock onto the charging station so as to allow the charge collector to be drawn towards and contact the charge head of the charge station by the magnetic attractive force between the charge collector and the charge head, more specifically, the at least two charge-receiving pads of the charge collector mates with at least two corresponding charge-providing pads of the charge head. Preferably, the charge collector is extendible from and retractable within an outer housing so that it is drawn towards the charge head under the influence of a magnetic attractive force and pushed away from the charge head under the influence of a magnetic repulsive force. More preferably, the charge collector comprise a telescopic element comprising an inner housing receivable within an outer housing.

Preferably, the vehicle body comprises a skirt body comprising a first pair of opposite side walls and a second pair of opposite side walls, wherein the electrical charge point is mounted to a bottom edge of at least one of the first and/or second pair of opposite sidewalls. This provides the flexibility to mount the charge collector to a bottom edge of the load handling device so as to cooperate with the charge head mounted to a grid rail or track. Mating with the charge head occurs when the load handling device is positioned and parked over the charge head mounted to the rail or track such that the charge collector is drawn towards the charge head under the influence of a magnetic attractive force, i.e. the charge collector is pulled down towards the charge head by the magnetic attractive force. By mounting the charge collector at the bottom edge of the skirt of the vehicle body so as to engage with the charge head mounted to a rail or track on the grid framework structure, preserves the container-receiving space to accommodate a container from above.

The present invention provides a storage system comprising:

i) a grid framework supporting a pathway arranged in a grid pattern comprising a plurality of grid spaces or grid cells;

ii) a load handling device for lifting and moving containers stacked in the grid framework structure, the load handing device comprising
   a) a vehicle body housing a driving mechanism operatively arranged for moving the load handling device on the grid framework;
   b) a lifting device comprising a lifting drive assembly and a grabber device configured, in use, to releasably grip a container and lift the container from the stack into a container-receiving space, said driving mechanism and the lifting drive assembly are powered by a rechargeable power source electrically coupled to an electrical charge point arranged on the vehicle body comprising a charge collector;

iii) a charge station comprising a charge head electrically coupled to a power source charger;

characterised in that:

the charge head is connectable with the charge collector to charge the rechargeable power source of the load handling device under the action of a magnet.

Optionally, the pathway comprises a plurality of rails or tracks; more preferably the pathway comprises a first set of parallel rails or tracks extending in a first direction and a second set of parallel rails or tracks extending in a second direction, the first direction being substantially perpendicular to the second direction so that the first set of parallel rails or tracks and the second set of parallel rails or tracks are arranged in a grid pattern. Optionally, the vehicle body houses the lifting device comprising the lifting drive assembly and the grabber device such that the grabber device is configured, in use, to releasably grip a container and lift the container from a stack in the framework into a container-receiving space. Optionally, the grabber device is suspended from the vehicle body of the load handling device by four tethers. Where the container receiving space is a cavity or recess within the vehicle body, this could be from within the vehicle body or alternatively, where the vehicle body includes a cantilever, the grabber device is suspended from the cantilever of the vehicle body. Preferably, the tether is in the form of a tape or band or a rope. Optionally, the vehicle body houses the rechargeable power source.

In one aspect of the present invention, the charge collector and/or the charge head of the charge station comprises one or more magnets arranged to electrically couple with each other under the action of a magnetic attractive force and/or electrically disconnect from each other under the action of a magnetic repulsive force. Preferably, the one or more magnets are permanent magnets. Preferably, either or both the charge collector or the charge head is/are moveable to electrically couple with each other under the action of the magnet. Thus, the charge collector and the charge head are arranged to be drawn towards each other under the action of the magnetic attractive forces. More specifically, the charge receiving pads of the charge collector and the charge providing pads of the charge head are arranged to be drawn towards each other under the action of the magnetic attractive forces.

In a charging operation, the load handling device is manoeuvred so that the electrical charge point mounted to the vehicle body is offered up to the charge head of the charge station so that the charge-receiving pads of the charge collector align with the charge-providing pads of the charge head. Under the action of a magnetic attractive force, the charge collector and/or the charge head are drawn to contact each other. To cease the charging operation, the load handling device is moved so that one or more magnets in the charge collector and/or the charge head are positioned to repel each other causing either the charge collector or the charge head, depending on which of them is moveable, is pushed and retracted within its outer housing. The magnets are arranged in the charge collector and the charge head to attract towards or repel each other depending on the position of the charge collector relative to the charge head, i.e. unlike poles of the magnet face each other to cause magnetic attraction and like poles face each other to cause magnetic repulsion. To disconnect the charge collector from the charge head, the load handing device is instructed to move so that one or more magnets in the charge collector repel one or more magnets in the charge head, i.e. like poles of the magnet face each other, causing either the charge collector or the charge head to retract. Once safely retracted, the load handling device can continue to move on the grid framework structure. Alternatively, the charge head is biased to retract within its outer housing by a resilient member, e.g. a spring.

To permit the charge head to electrically couple with the charge collector of the load handling device, preferably the charge head is mounted to at least one of the plurality of rails or tracks on the grid framework structure. More preferably, the charge head is mounted to an arm that is moveable to electrically couple with the charge collector of the load handling device. For example, one end of the arm is mounted to the rail and the charge head is mounted to the other end of the arm. Preferably, the arm is moveable in response to a signal from a controller. For example, the arm is instructed to move the charge head to electrically couple the charge head mounted to one end of the arm with the charge collector mounted to an exterior surface of the vehicle body. Alternatively, the charge head can be mounted to one of the rails or tracks on the grid framework to mate with a charge collector mounted to a skirt of the vehicle body.

In an alternative embodiment of the present invention, the charge head is connectable with the charge collector to charge the rechargeable power source of the load handling device under the action of an electromagnet. Preferably, the electromagnet is activated or actuated when the charge-providing pads of the charge head are in contact with the charge-receiving pads of the charge collector. Forces in the region of 40 Newtons can be established between the contact surfaces of the charge collector and the charge head when the electromagnet is activated or actuated, i.e. switched on. Preferably, the electromagnet is activated or actuated by an actuator such that when the actuator is actuated, the electromagnet is activated or actuated to be drawn towards the charge head. Optionally, the actuator can be a contact switch that has an open a circuit configuration when actuated. Preferably, the charge head is arranged to be lowered under gravity to contact the charge collector such that when the charge-providing pads of the charge head are in contact with the charge-receiving pads of the charge collector, the electromagnet is activated or actuated by the actuator (the actuator activates or actuates the electromagnet). In the example where the actuator is a contact switch, the contact switch is in a closed configuration as the charge head is lowered under gravity towards the charge head. Once the charge head contacts the charge collector, the contact switch is broken, i.e. breaks a circuit. The break in the contact switch activates or actuates the electromagnet to pull the charge head into contact with the charge collector under the action of the magnetic attractive force of the electromagnet. Preferably, the charge-receiving pads of the charge collector and/or the charge-providing pads of the charge head respectively are outwardly biased by a resilient member (sprung loaded) to increase the surface contact area and clamping force between the charge head and the charge collector. More preferably, the charge-receiving pads of the charge collector and/or the charge-providing pads of the charge head respectively are sprung so as to lessen the impact that the charge pads have on each other.

Preferably, a control system is operable to supply current to charge the rechargeable power source in response to the electromagnet being activated or actuated. The use of an actuator to switch on or increase the current from a power source charger to the rechargeable power source in the load handling device, which can be of the order of 160 amps, helps to mitigate arcing between the contact pads of the charge head and the charge collector. Initially, a small or zero voltage is established between the charge head and the charge collector that is low enough to not cause arcing between their respective contact pads when in contact. Once a connection is made between the charge head and the charge collector, the control system is instructed to supply or increase the charging current to the rechargeable power source via the charge head, e.g. via a break in the contact switch. Preferably, the control system is operable to supply current to the rechargeable power source after a predetermined amount of time has elapsed since the electromagnet was activated or actuated. By transferring power to the rechargeable power source after a predetermined amount of time has elapsed since the electromagnet was activated or actuated, arcing between the charge head and the charge collector is mitigated. The predetermined amount of time helps to allow the electromagnet to apply a sufficient pulling force of the charge head onto the charge collector to establish a relatively low contact resistance between the contact pads, i.e. establish maximum contact surface area, such that when the current begins to flow through the charge head into the charge collector which can be as much as 160 amps, the low contact resistance mitigates any excessive arcing.

Preferably, the charge head is guided in a vertical direction by at least one guide member.

Preferably, the charge head is raised to disconnect from the charge collector by a linear actuator. The linear actuator is arranged to lift the charge head to disengage the charge head from the charge collector of the load handling device, e.g. after a charging operation.

The present invention provides a method of charging a rechargeable power source of a load handling device in a storage system of the present invention, comprising the steps in the order of:

a) lowering the charge head towards the charge collector of the charge point,
b) activating the electromagnet to pull the charge head towards the charge collector under a magnetic attractive force when the charge head contacts the charge collector,
c) supplying current to the rechargeable power source via the charge head.

Preferable the method further comprises the steps of:

d) activating or actuating the electromagnet in response to a signal from an actuator.

Preferably, the method further comprises the steps of supplying current to the rechargeable power source after a predetermined amount of time has elapsed since the electromagnet was activated or actuated.

BRIEF DESCRIPTION OF THE DRAWINGS

Further features and aspects of the present invention will be apparent from the following detailed description of an illustrative embodiment made with reference to the drawings, in which.

DETAILED DESCRIPTION

It is against the known features of the storage system, such as the grid framework structure and the load handling device described above with reference to FIGS. 1 to 6, that the present invention has been devised.

Figure 9:
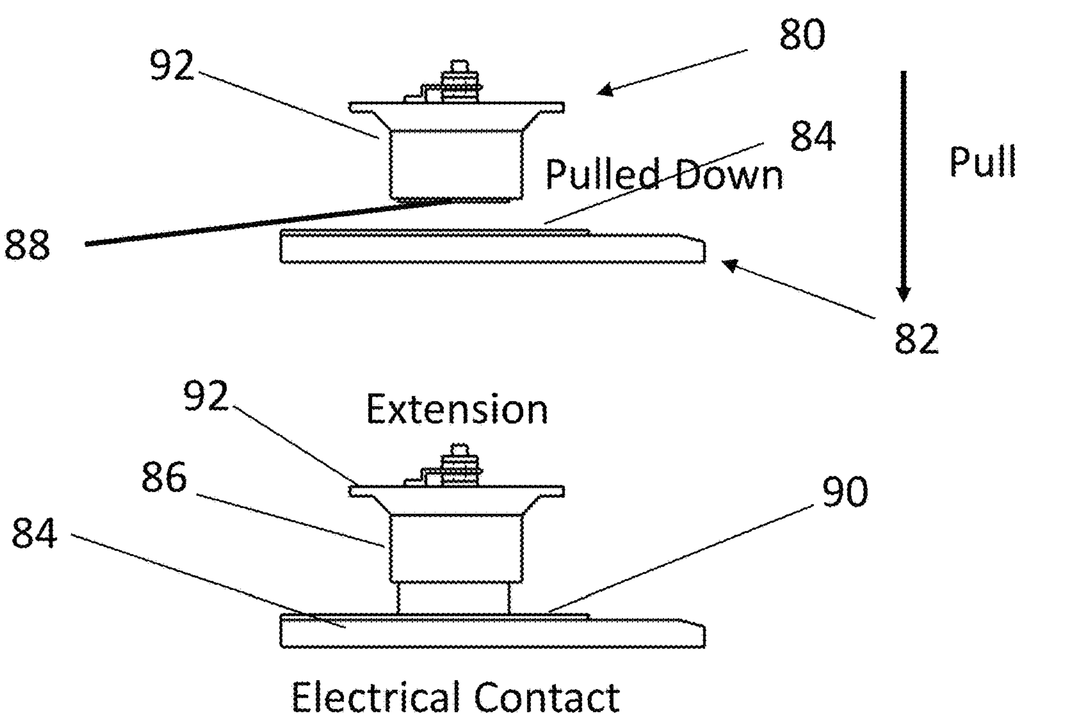
FIG. 9 is a schematic perspective view of the charge contact system showing the charge collector mating with the charge head according to a first embodiment of the present invention.
Figure 10:
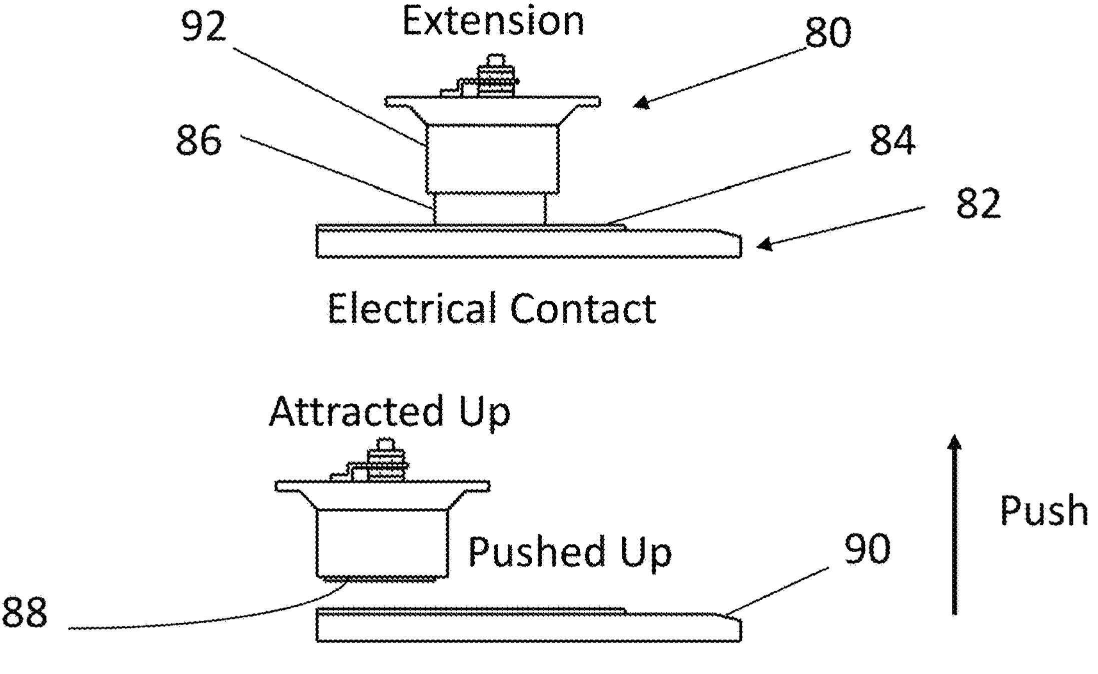
FIG. 10 is a schematic perspective view of the charge contact system showing disconnection of the charging system according to the first embodiment of the present invention.

FIGS. 9 and 10 respectively show the docking and disconnection of a charge contact system according to a first embodiment of the present invention. The charge contact system comprises an electrical charge point 80 which is arranged on the vehicle body of the load handling device and a charge head 84 forming a charge station 82. The charge contact system according to the present invention utilises a charge system commercially available from RoboteQ® having a head office in 7812 E. Acoma Dr. Suite 1, Scottsdale Ariz. 85260, USA. The electrical charge point 80 comprises a charge collector 86 comprising at least two charge receiving pads 88 which are arranged to cooperate with at least two charging providing pads 90 of the charge head 84. Power is supplied to the charge head 84 by a suitable power source charger (not shown). In the particular embodiment of the present invention, the two charge providing pads provide a direct current, i.e. one of the charge-providing pads 90 is DC and the other is DC+. The charge collector 86 is arranged to be moveable relative to the vehicle body of the load handling device. In the particular embodiment of the present invention, the charge collector 86 is extendable from and retractable within an outer housing 92. More specifically, the charge receiving pads 88 are mounted to an inner housing which is moveable within the outer housing 92 in a telescopic manner. FIG. 9 shows the charge collector 86 in both a retracted configuration and an extended configuration.

Figure 1:
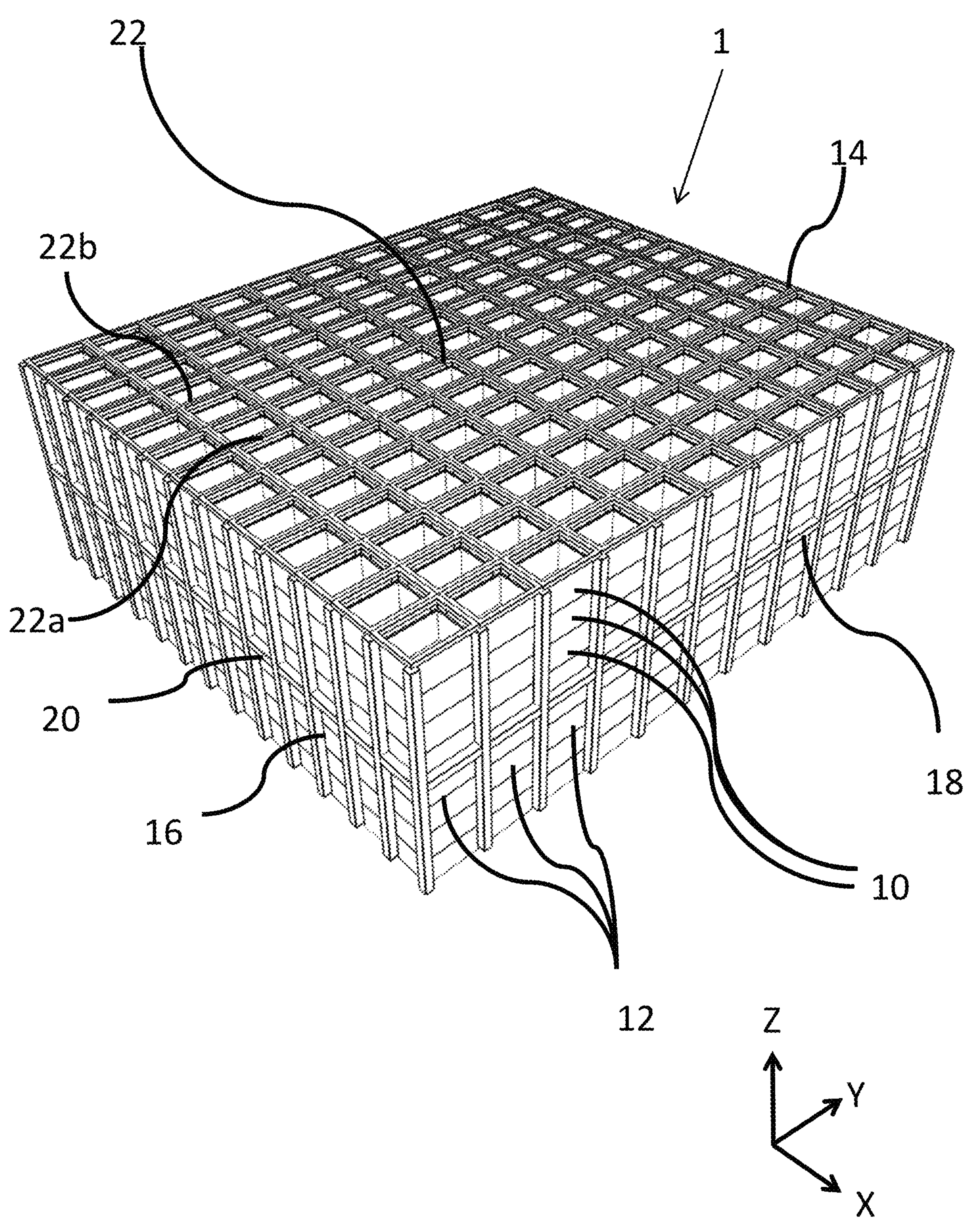
FIG. 1 is a schematic diagram of a grid framework structure according to a known system.
Figure 2:
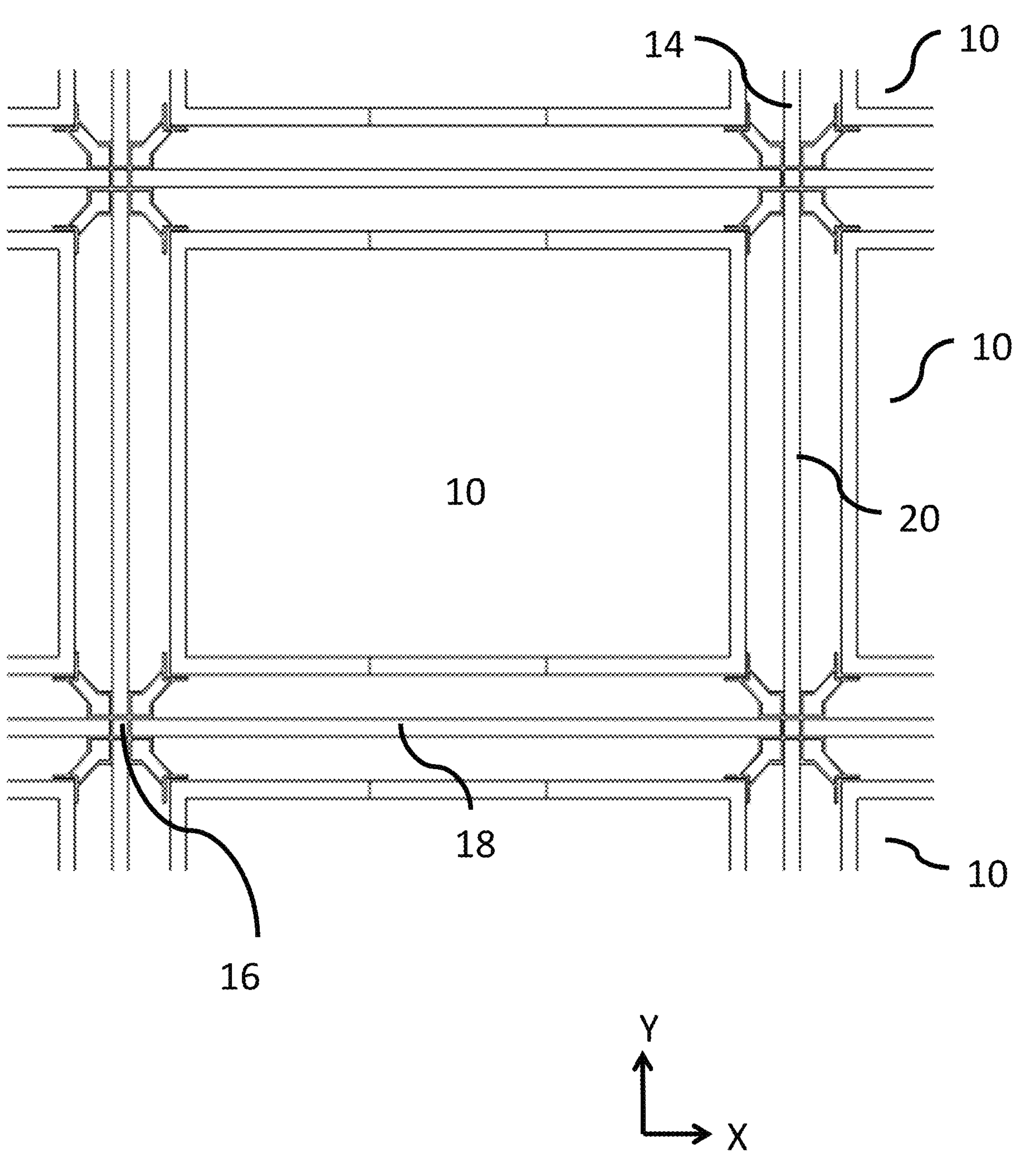
FIG. 2 is a schematic diagram of a top down view showing a stack of bins arranged within the grid framework structure of FIG. 1.
Figure 3:
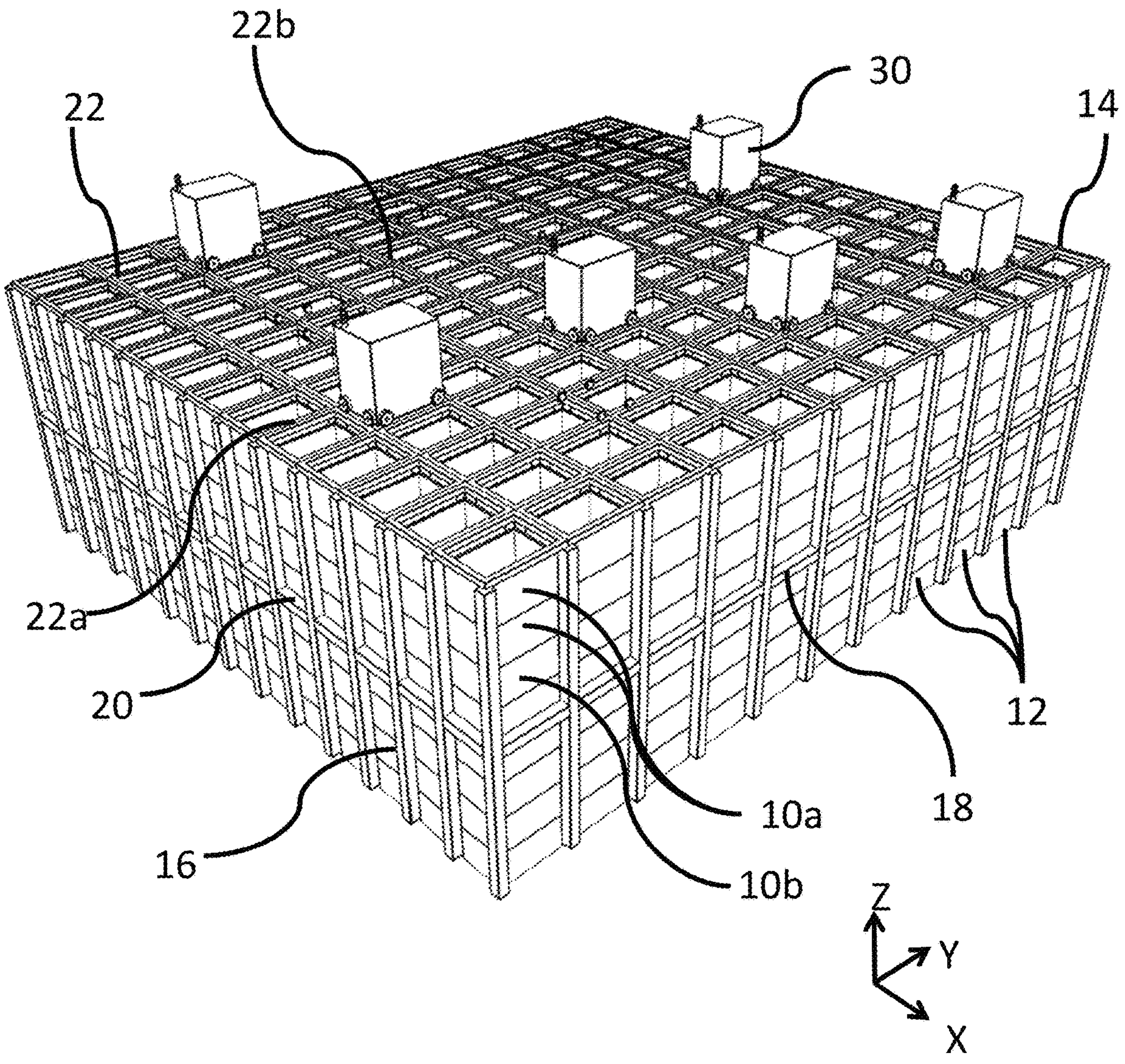
FIG. 3 is a schematic diagram of a system of a known load handling device operating on the grid framework structure.
Figure 4:
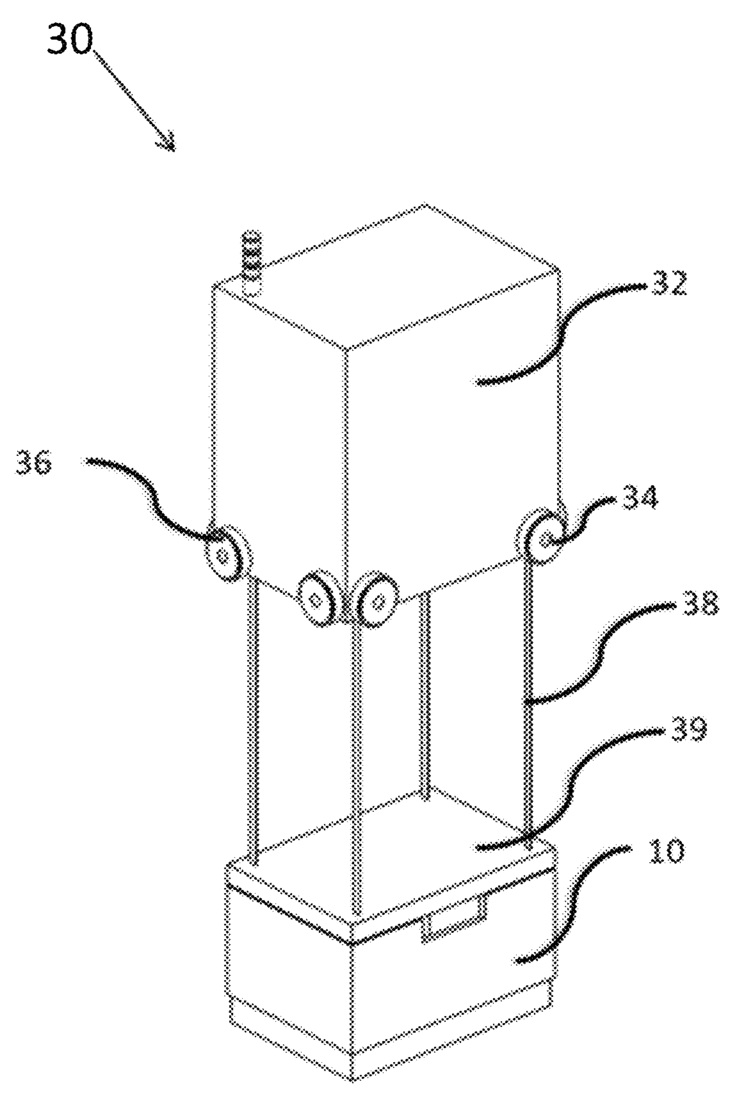
FIG. 4 is a schematic perspective view of the load handling device showing the lifting device gripping a container from above.
Figure 5:
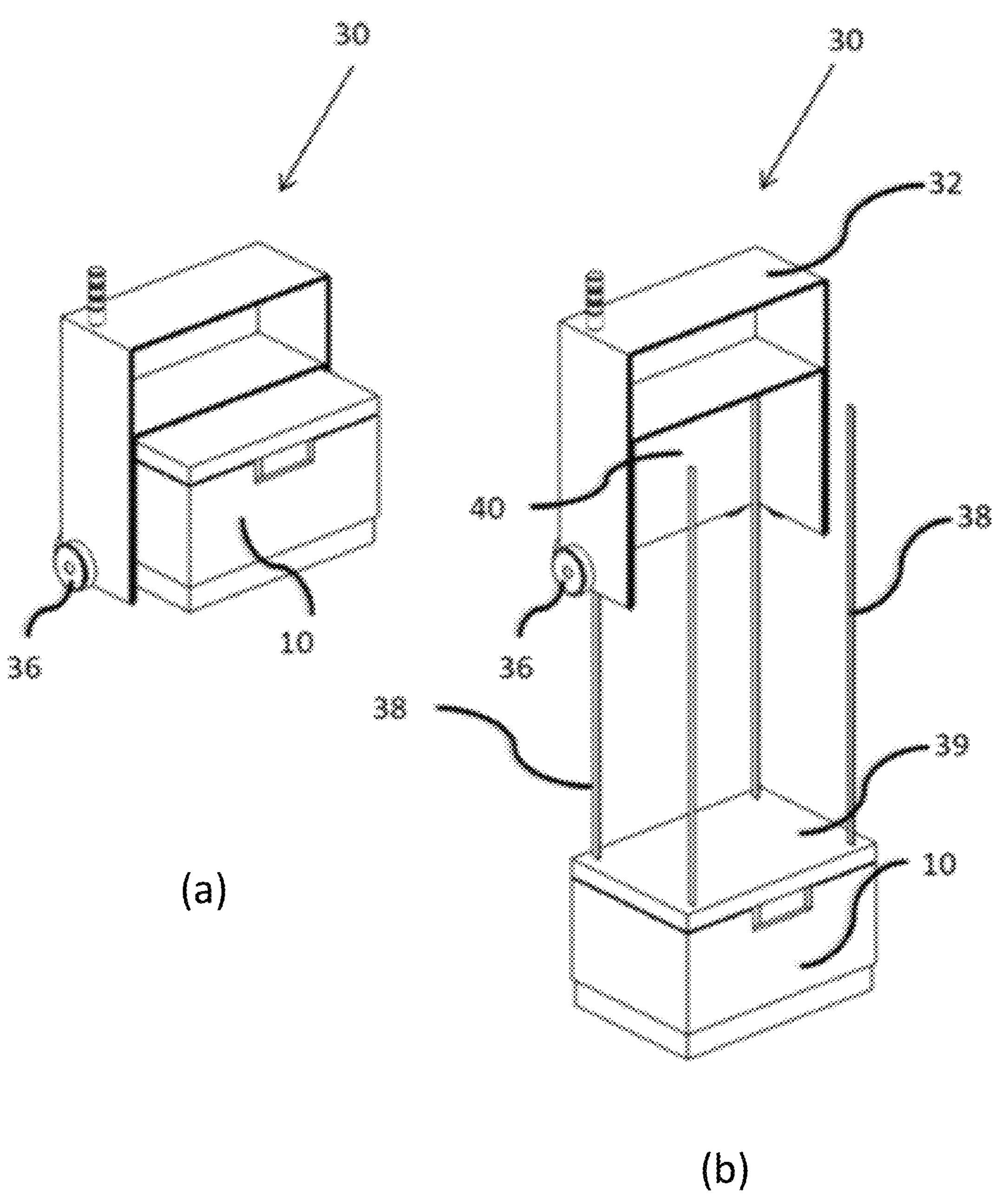
FIGS. 5(*a*) and 5(*b*) are schematic perspective cut away views of the load handling device of FIG. 4 showing (a) the container receiving space of the load handling device and (b) a container accommodated within the container receiving space of the load handling device.
Figure 6:
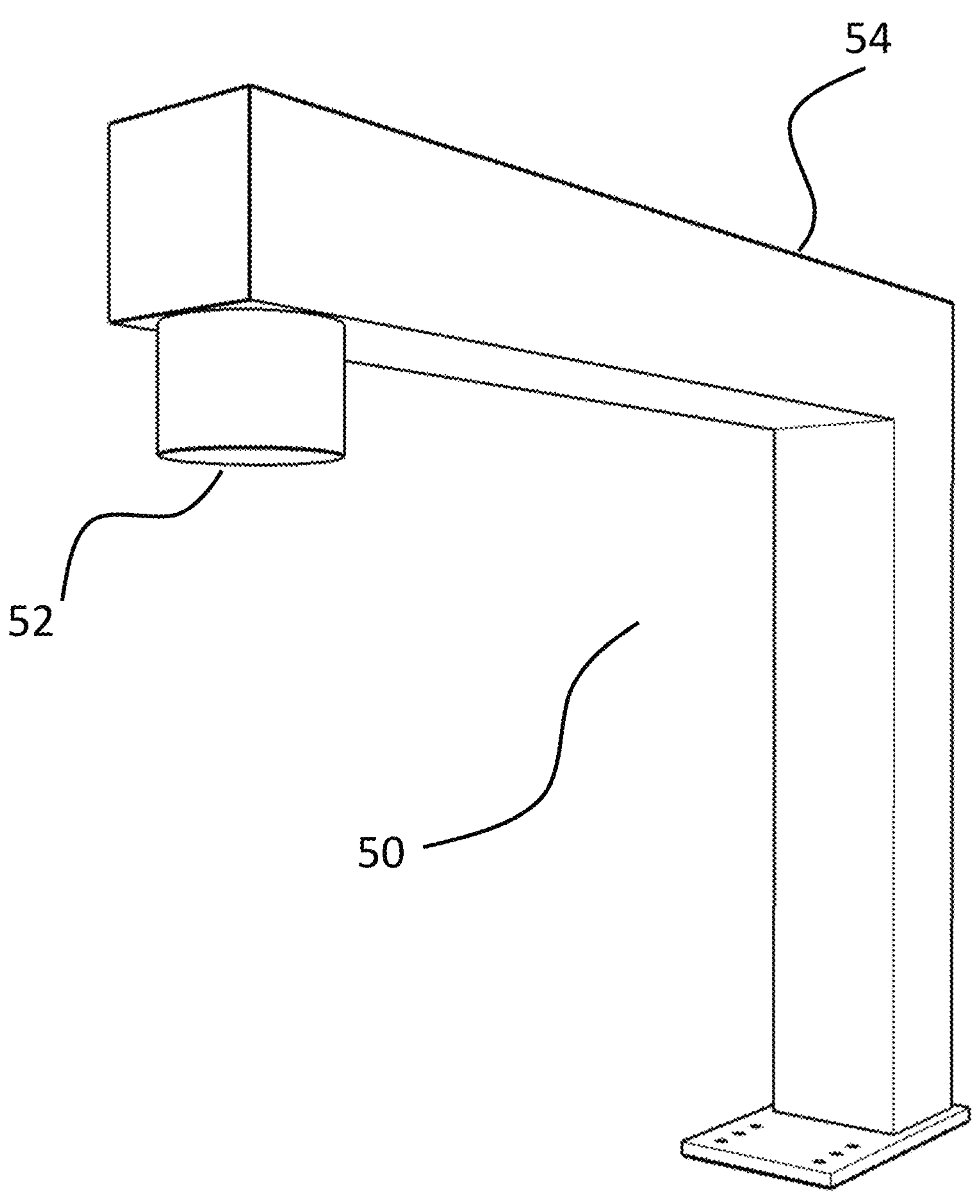
FIG. 6 is a schematic diagram showing a known charging station comprising a charge unit suspended from a support structure.
Figures 7A, 7B:
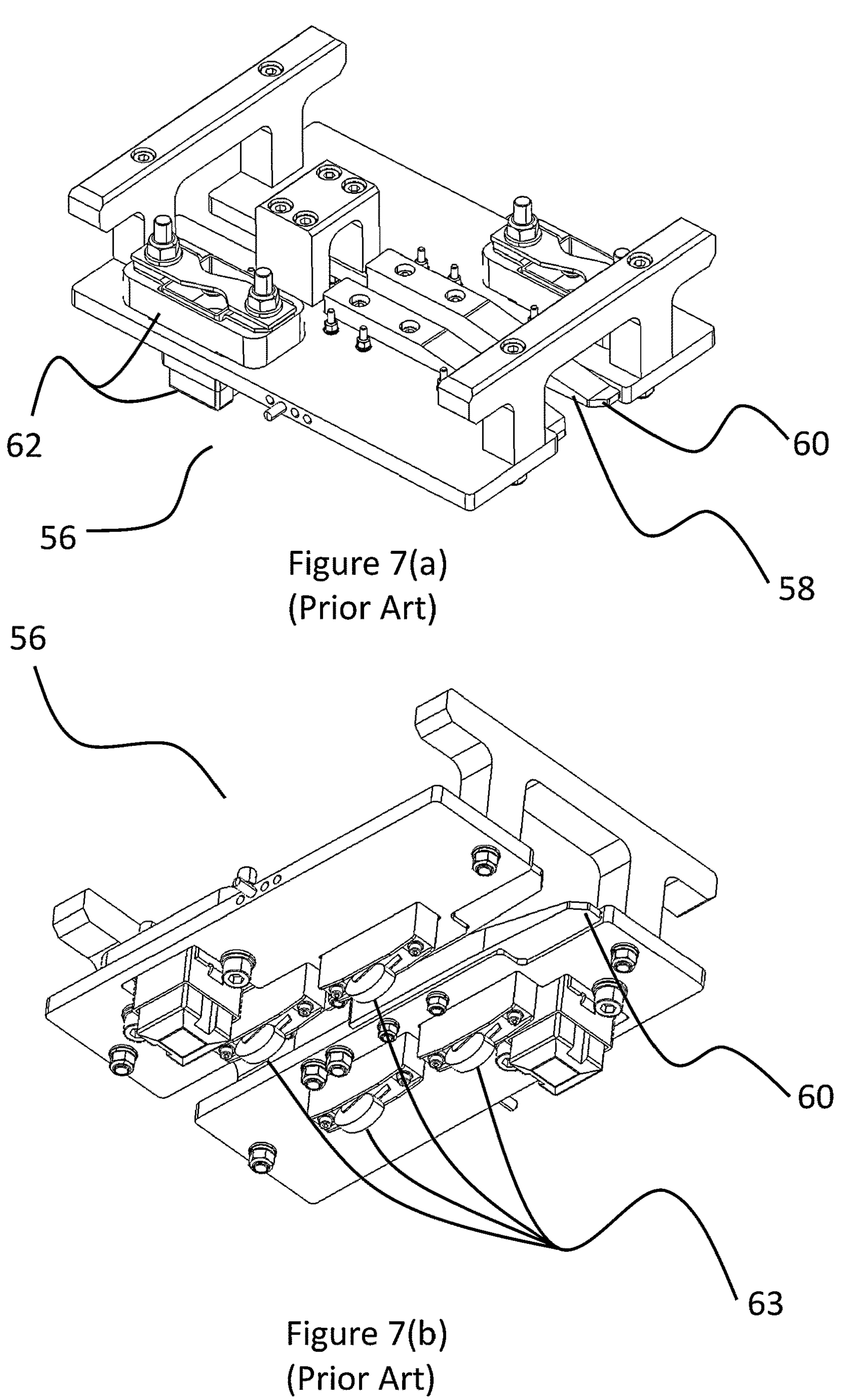
FIG. 7*a* is a schematic diagram from above of a known charge unit or charge head showing a plurality of profiled sections.
FIG. 7*b* is a schematic diagram from below of the known charge unit or charge head showing a power transfer unit.
Figure 8:
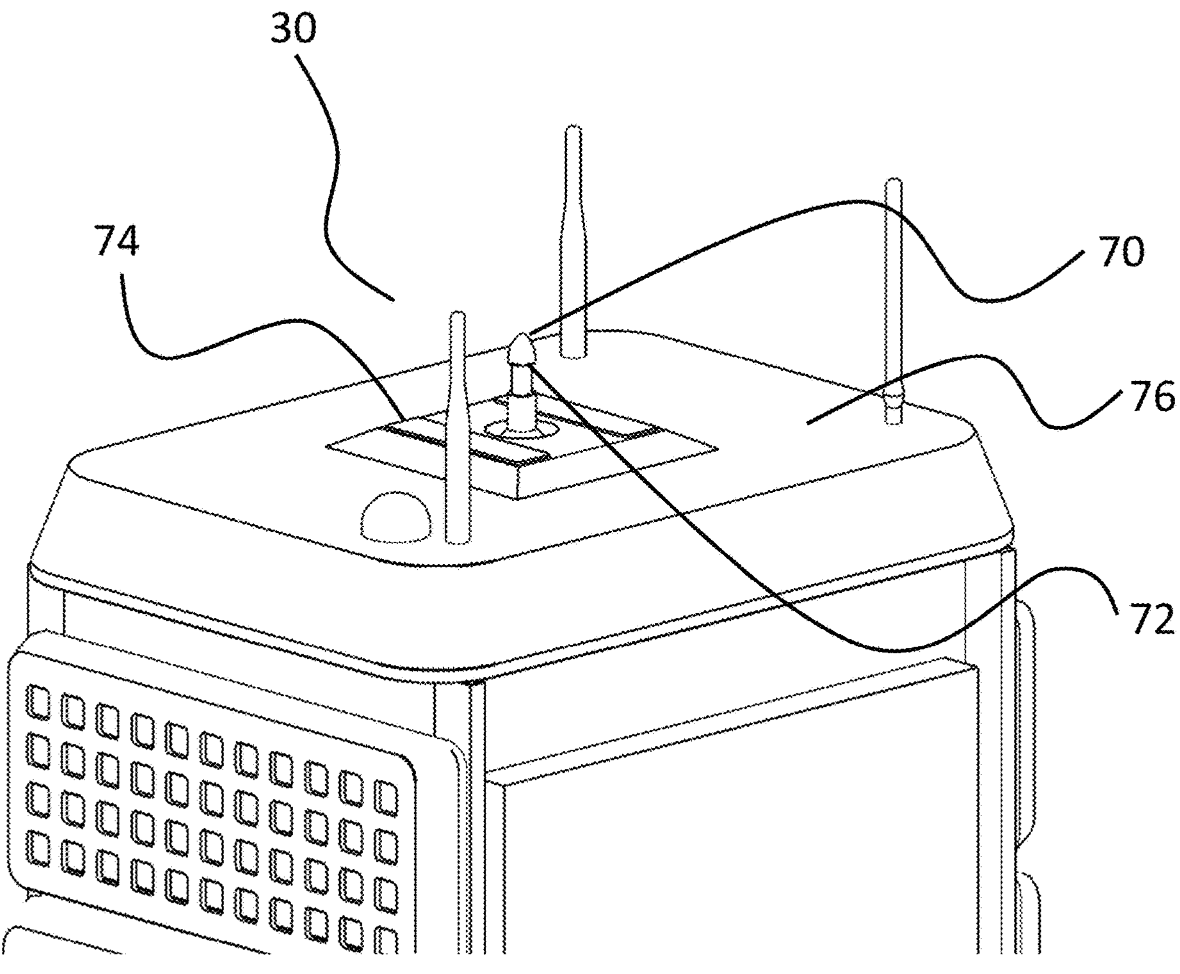
FIG. 8 is a schematic view of a top surface of a known load handling device.

Whilst the container receiving space 40 for accommodating a container when it is lifted by the crane mechanism is arranged within the vehicle body 32 shown in FIG. 5, the present invention is not limited to the container receive space 40 being located within the vehicle body 32. The present invention is also applicable to the container receiving space being located below a cantilever such as in the case where the vehicle body of the load handling device has a cantilever construction as described in WO2019/238702 (Autostore Technology AS). For the purpose of the invention, the term "vehicle body" is construed to optionally cover a cantilever such that the grabber device is located below the cantilever. However, for ease of explanation of the present invention, the container receiving space for receiving a container is arranged within a cavity or recess within the vehicle body.

The outer housing 92 of the electrical charge point 80 is mounted to the vehicle body of the load handling device so as to allow the charge collector to be moveable relative to the vehicle body. Any means to mount the outer housing 92 to the vehicle body is applicable in the present invention, e.g. use of bolt, screw or adhesive etc. The charge collector 86 comprises one or more magnets (not shown) that are arranged to be attracted to one or more magnets (not shown) in the charge head 84 when the charge collector 86 is positioned over the charge head 84, i.e. unlike poles of the respective one or more magnets in both the charge collector 86 and the charge head align. The magnetic attractive force causes the charge receiving pads 88 of the charge collector 86 to move towards and physically contact the charge providing pads 90 of the charge head 84. This is demonstrated by the arrow shown in FIG. 9. The one or more magnets are permanents magnets, preferably rare earth magnets. The use of rare earth magnets provides the necessary pulling force to physically clamp the charge receiving pads of the charge collector against the charge providing pads of the charge head with sufficient force to prevent arcing and lower the contact resistance. Typically, a clamping force of 40N is required to prevent arcing and lower the contact resistance. Examples of rare earth magnets include but are not limited to neodymium magnets and samarium cobalt magnets.

Disconnection of the charge collector 86 from the charge head 84 involves moving the charge collector 86 to cause the one or more magnets in the charge collector 86 to repel one or more magnets in the charge head 84. Optionally, the charge head 84 comprises two or more sets of magnets, each set comprising at least one magnet that are positioned side by side. A first set of magnets in the charge head is arranged to magnetically attract the one or more magnets in the charge collector 86. A second set of magnets in the charge head is arranged to magnetically repel the one or more magnets in the charge collector. The reverse is equally applicable where the charge collector 86 comprises two or more sets of magnets that is arranged to magnetically attract and/or repel the one or more magnets in the charge head. In use, the charge collector mounted to the load handling device is moved along the charge head 84 so that like poles of one or more magnets in both the charge collector 86 and the charge head 84 align. The strong repulsive force experienced by the charge collector causes an instant retraction of the charge collector 86 within the outer housing 92 and is therefore, raised clear of the charge head 84 for the load handling device to continue on its course along the track. This is demonstrated by the push arrow shown in FIG. 10. The alignment of the charge collector with the charge head can take the form of the load handling device positioning itself against the charge station. Thus, in a first position of the load handling device relative to the charge station, the charge collector 86 extends to contact the charge head 84 and in a second position of the load handling device relative to the charge station, the charge collector 86 retracts and disconnects from the charge head 84.

The charge collector 86 can be held in its retracted configuration by magnetic attractive forces of the one or more magnets in the charge collector 86. To allow the charge collector 86 to be drawn towards the charge head 84, strong rare earth magnets are located in the charge head 84 which overcomes the magnetic attractive forces holding the charge collector 86 in its retracted configuration. By controlling the strength of the magnets in the charge head 84 and the charge collector 86, the charge collector 86 can be held in its retracted configuration to safely traverse along the rail or tracks on the grid framework structure and when docked at the charge station, the strong magnetic attractive forces of the one or more magnets in the charge head 84 overcomes the magnet attractive forces holding the charge collector 86 in its retracted configuration to cause the charge collector 86 to move and be drawn towards the charge head 84. In an alternative arrangement, the charge collector is held (or biased) in its retracted configuration within the outer housing 92 by a resilient member, e.g. by use of a spring, and is only drawn towards the charge head by the magnetic attractive forces generated between the charge head and the charge collector overcoming the biasing force. This removes the need to have a separate set of magnets to retract the charge collector into its outer housing.

Whilst the particular embodiment shown in FIGS. 9 and 10, describes the charge collector 86 to be moveable relative to the charge head 84, the reverse is equally applicable where the charge collector 86 is fixed and the charge head 84 is moveable towards the charge collector 86 during a charging operation. This removes the need for the charge collector 86 to be retracted (e.g. raised) in order to provide clearance for the load handling device to travel along the rails as the charge receiving pads 88 of the charge collector 86 may be made substantially flush with the surface of at least one wall of the vehicle body or at least slightly proud of the surface of at least one wall of the vehicle body but sufficiently clear to not present an obstacle when travelling on the rails. During a charging operation, when the load handling device is docked at the charging station, the charge head 84 is moveable to extend towards the charge collector 86 under a strong attractive magnetic force as a result of the one or more magnets in the charge collector 86 and the charge head 84. Whilst it is beneficial that the charge head 84 disconnects from the charge collector by retracting within its outer housing by magnetic repulsive forces, it is not an essential operation since the charge head 84 does not present itself as an obstacle as it is always in a fixed location. Movement of the load handling device can cause disconnection of the charge collector from the charge head. However, movement of either the charge collector 86 or the charge head 84 towards each other helps to mitigate potential alignment problems between the contact surfaces of the charge receiving pads 88 of the charge collector 86 and the charge providing pads 90 of the charge head 84. Equally, movement of either the charge collector 86 and/or the charge head 84 towards each other also helps to accommodate height differences of load handling devices.

Figure 11:
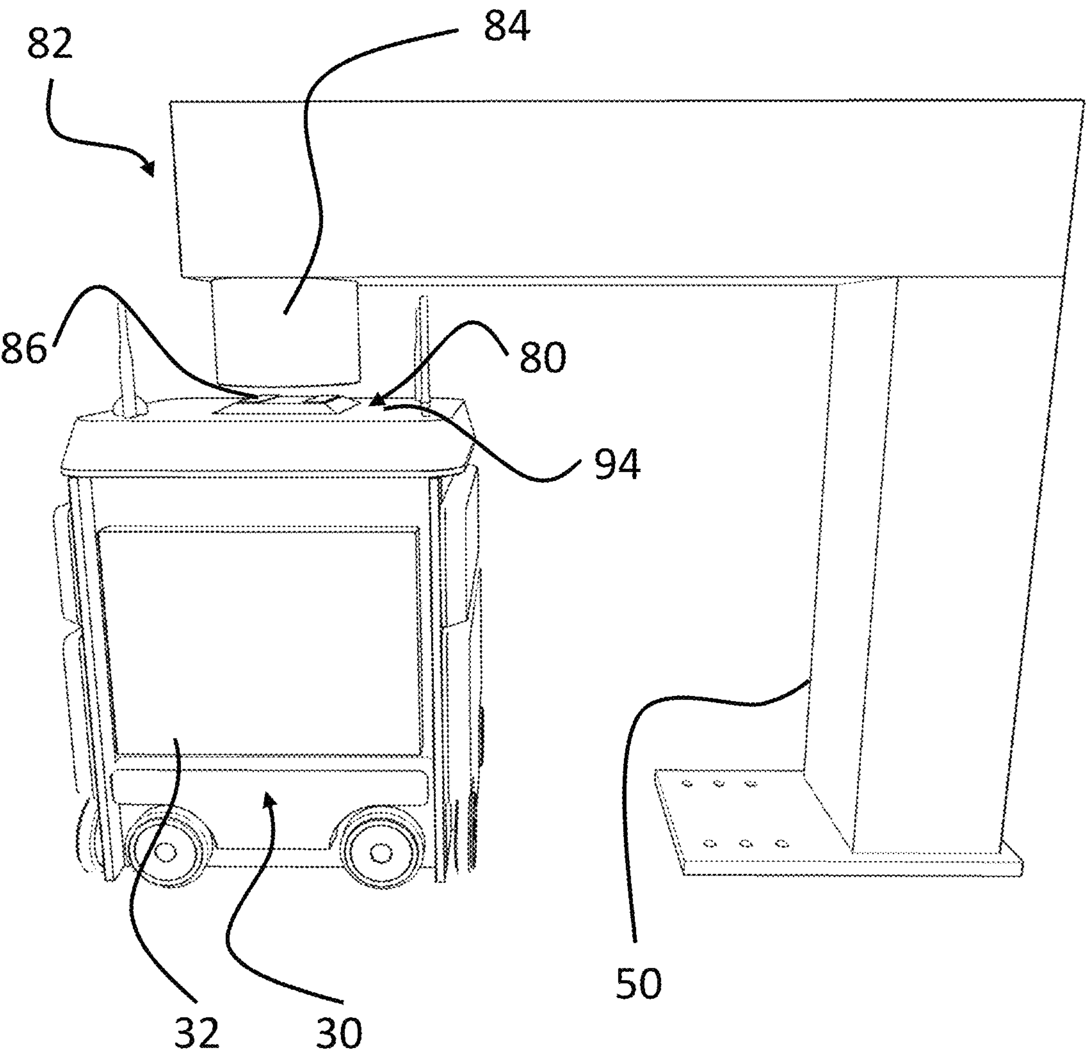
FIG. 11 is a schematic perspective view of a side view of the load handling device docked at a charging station in one arrangement according to the first embodiment of the present invention.
Figure 12:
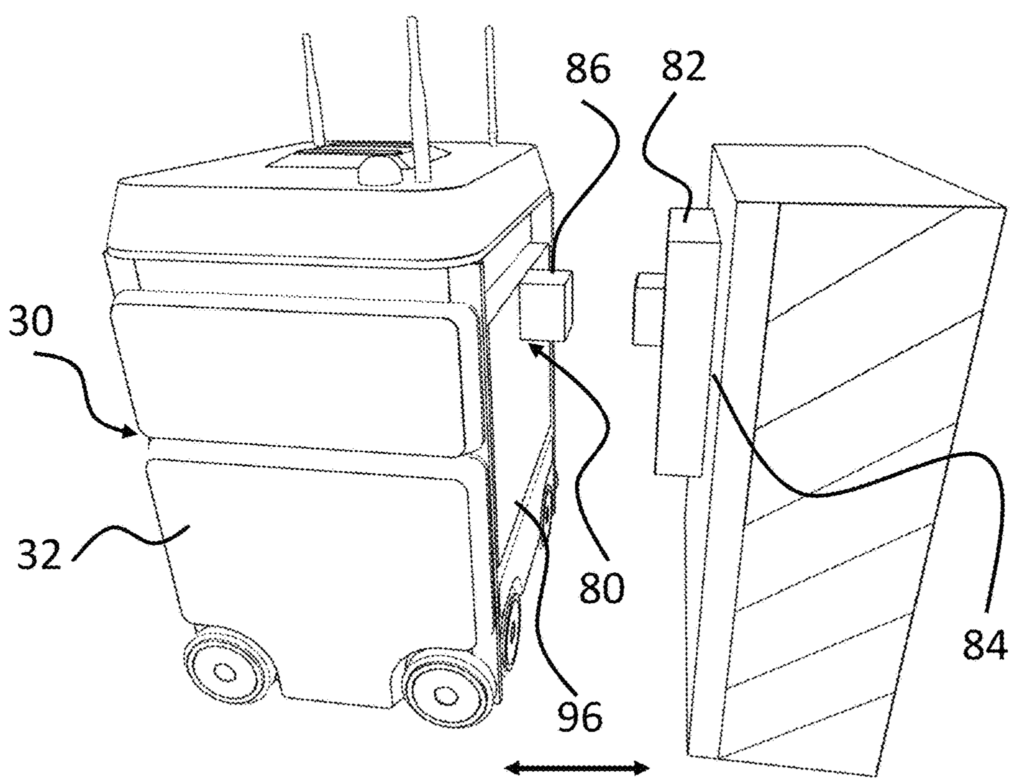
FIG. 12 is a schematic perspective view of a side view of the load handling device docked at a charging station in a second arrangement according to the first embodiment of the present invention.
Figure 13:
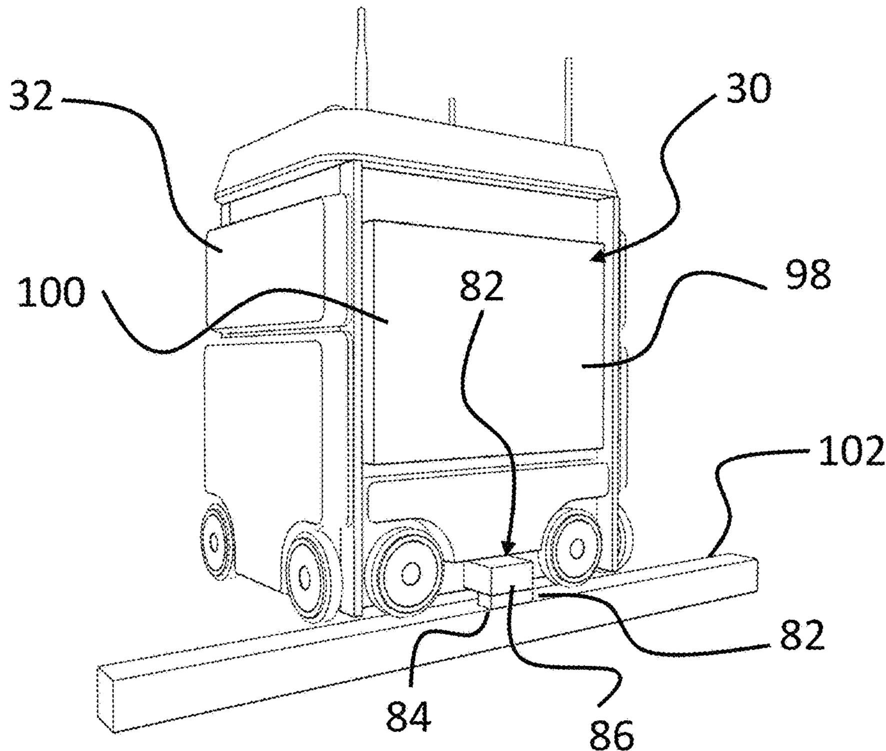
FIG. 13 is a schematic perspective view of a side view of the load handling device docked at a charging station in a third arrangement according to the first embodiment of the present invention.

The charge contact system according to the present invention shown in FIGS. 9 and 10 can be mounted to different areas of the vehicle body, thereby providing different charging regimes. FIGS. 11 to 13 shows the different charging regimes according to the present invention. FIG. 11 is an example where the moveable part of the charge contact system of the present invention representing the charge head is drawn towards the charge collector fixed to a top wall 94 of the load handling device. The electrical charge point 80 shown in FIG. 11 is arranged on the exterior surface of a top wall 94 of the vehicle body 32. This allows for the charge head 84 of the present invention to be retrofitted to an existing charge station having an L shaped framework 50 discussed above in the introductory part of the patent specification. The charge head 84 is suspended from the L shaped framework 50 and positioned to cooperate with the charge collector 86 mounted to the top wall 94 of the vehicle body 32 when the load handling device 30 is docked underneath the charge head 84 of the charge station 82.

In another charging arrangement, the electrical charge point 80 is arranged to one of the side walls 96 of the vehicle body 32 as shown in FIG. 12. In this configuration, charging occurs by the load handling device 30 laterally docking onto the charge station 82 in a sideways direction as indicated by the arrow shown in FIG. 12. This removes the need to have a dedicated framework to suspend the charge head over the load handling device as shown in FIG. 11 as the charge head 84 can be mounted to a side wall proximate the grid framework structure or a crash barrier that has been retrofitted to accommodate a charge station. Analogous to the arrangement shown in FIG. 11, the charge collector 86 can be made to be moveable relative to the vehicle body 32, i.e. the charge contact system of the present invention can be orientated so that the charge collector 86 is moveable to be drawn towards the charge head 84, which remains fixed, when docked at the charge station 82.

To remove clutter around the grid framework structure, the charge contact system of the present invention can be located at floor level of the grid framework structure. As shown in FIG. 13, the charge collector 86 can be mounted at the foot of the vehicle body 32, e.g. at the bottom edge of a skirt of the vehicle body 32. The vehicle body 32 housing the auxiliary components of the load handling device such as the drive motors comprises a skirt body comprising a first pair of opposite side walls 98 and a second pair of opposite side walls 100. The electrical charge point 80 is mounted to a bottom edge of at least one of the first and/or second pair opposite sidewalls 98, 100 that is arranged to cooperate with the charge head 84 mounted to a rail or track 102 on the grid framework structure. In this way, charging occurs when the load handling device 30 drives over and positions itself over a rail or track 102 comprising the charge head 84 mounted thereon to electrically couple with the electrical charge point 80, more specifically the charge collector 86. A moveable arm (not shown) can be used to correctly position the charge head 84 onto the charge collector 86 so that the corresponding charge providing pads 90 and charge receiving pads 88 properly align. The moveable arm can be a robotic arm having one end mounted to a track or grid within a grid cell and the charge head is mounted to the other end of the moveable arm. During a charging operation, the moveable arm is instructed by a controller to position the charge head 84 into engagement with the charge point 80 of the load handling device 30, more specifically the charge collector 86 so that either the charge head 84 or the charge collector 86 are drawn towards each other, depending which is the moveable component, by magnetic attraction. The moveable arm can be pivotally mounted to a grid structure or rail on the grid framework structure.

Whilst the embodiments shown in FIGS. 11, 12 and 13 show different arrangements of the charge contact system mounted to the vehicle body, the present invention is not limited to the orientations shown in FIGS. 11 to 13. The electrical charge point of the present invention can be mounted to other areas of the vehicle body. Additional charge contacts of the present invention can be incorporated into the system to monitor the status of the battery. Thus, instead of functioning as a charge collector, one or more additional contact pads can be mounted to the load handling device for cooperating with corresponding contact pads of the charge station for supplying information on the status of the battery. The contact pads can have the same functionality as the charge contact system of the present invention described above, in that one or more contact pads are extendable from and retractable within an outer housing under the influence of one or more magnets. A control system can ensure that the charge-providing pads supply the required current based on the condition of the rechargeable battery. The condition may be based on at least one of voltage, temperature, state of charge, depth of discharge and state of health. The charge collector 86 or the charge head can be retractable within the outer housing by either magnetic forces or a resilient member, e.g. a spring.

In alternative embodiment of the present invention, the magnetic attractive forces between the charge head and the charge collector can be generated by an electromagnet rather than the use of one or more permanent magnets. The advantage of the use of an electromagnet over the use of permanent magnets is that the electromagnet can be controlled to generate the necessary magnetic attractive forces to draw the charge head to mate or physically contact the charge collector, e.g. by controlling the current through a coil making up the electromagnet. Examples of an electromagnet is a solenoid wound around a magnetic core commonly known in the art. In this way, one or more actuators mounted to the charge station can be used to activate or actuate the electromagnet to provide the necessary magnetic attractive force to physically clamp the charge head against the charge collector. In the particular embodiment of the present invention shown in FIGS. 14 to 16, the charge contact system 104 comprises a charge station 101 comprising a charge head 184 mounted to a support platform 106 moveable in the downward direction from a first position where the charge head is spaced apart from the charge collector and a second position where the charge head is in physical contact with the collector. In the particular embodiment of the present invention, the charge head is configured to move from the first position to the second position under action of gravity. The charge head 184 is mounted to the bottom wall of the moveable platform 106 so as to cooperate with the electrical charge point 185 comprising the charge collector 186 when the charge head 184 is lowered onto the charge collector 186. The platform 106 is guided to move in a vertical direction by at least one guide member 108, e.g. a guide rod. The platform is freely moveable along the guide member 108 so as to permit the platform to drop in a vertical direction under its own weight, i.e. under gravity. Dampers commonly known in the art can be used to decelerate or dampen the fall of the platform along the at least one guide member and therefore, lessen the impact of the charge head with the charge collector, e.g. one or more springs or gas springs etc.

Mounted to the support platform 106 are one or more electromagnetics 116. The one or more electromagnets are arranged to magnetically attract the charge head 184 to the charge collector 186 mounted to a top wall of the vehicle body 32 when the one or more electromagnets 116 are activated or actuated, i.e. when current though the coils of the electromagnet are switched on. In the particular embodiment of the present invention, the one or more electromagnets 116 is/are positioned to at least one edge of the platform so as to distribute the clamping force across the platform when the electromagnets are activated or actuated and therefore, across the contact pads 188, 190 of the charge head 84 and the charge collector 86.

Figure 14:
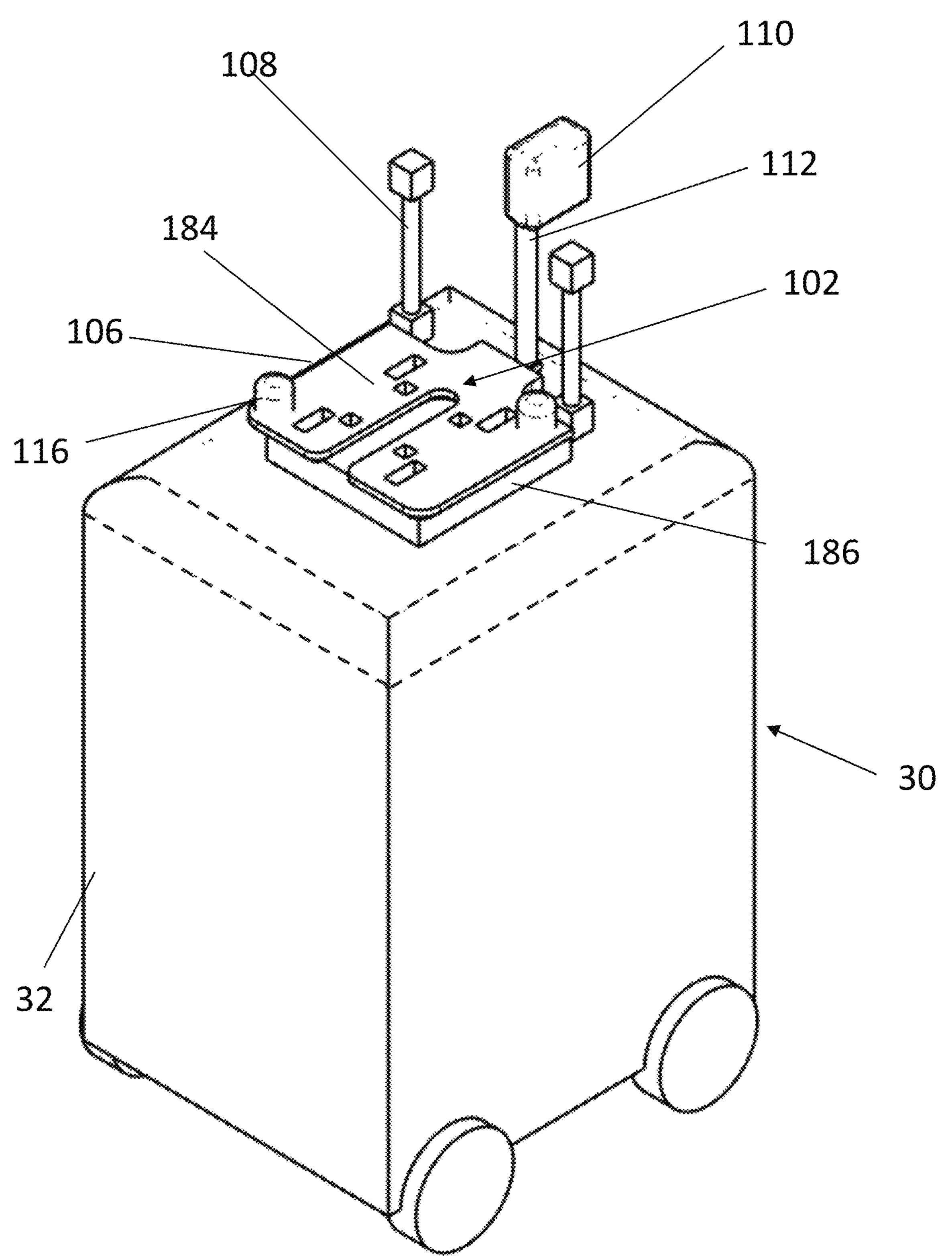
FIG. 14 is a schematic perspective view of the charging head engaged with the charge collector on the load handling device according to a second embodiment of the present invention.
Figure 15:
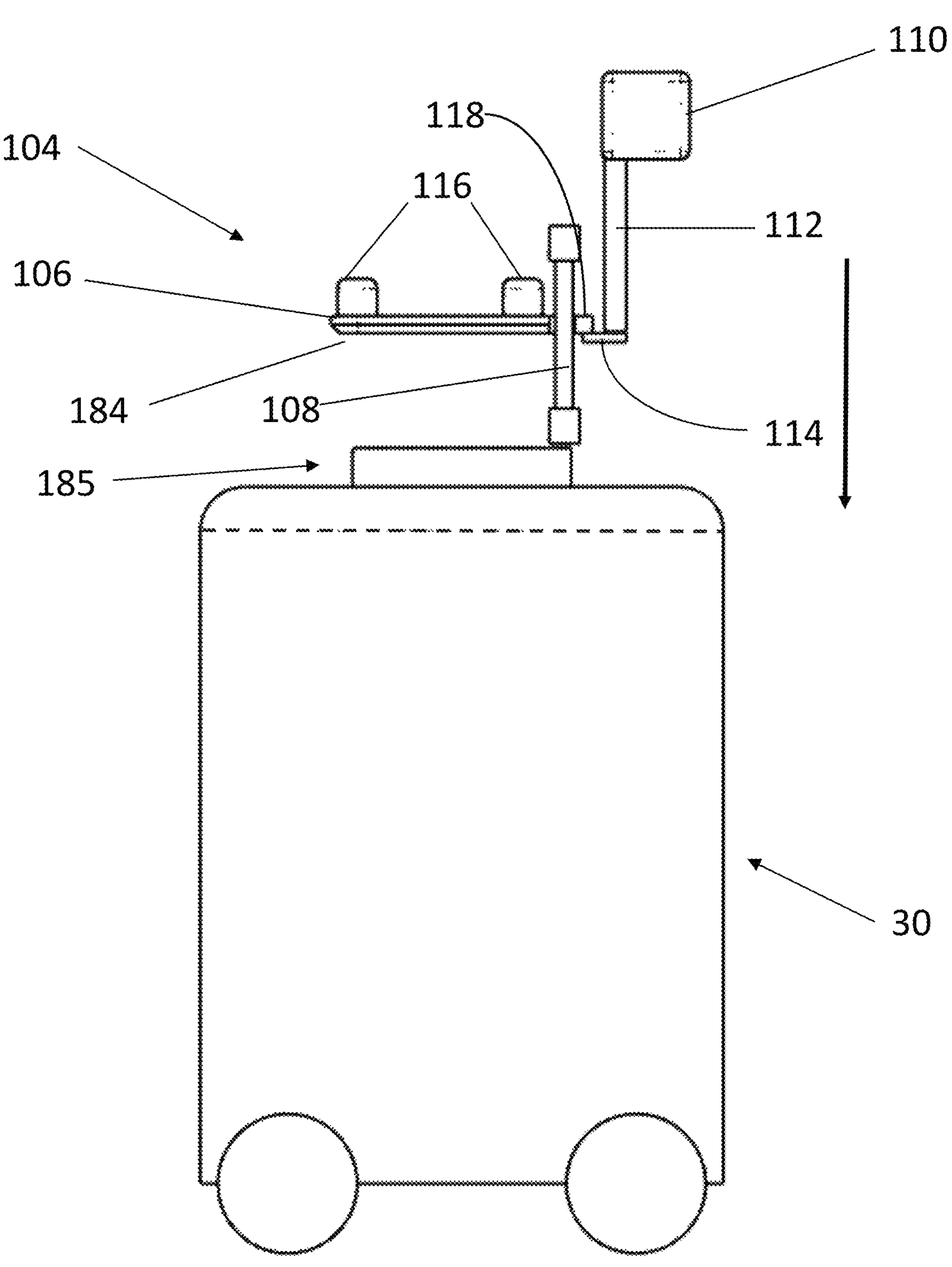
FIG. 15 is a perspective side view of the charge head disengaged from the charge collector on the load handling device according to the second embodiment of the present invention.
Figure 16:
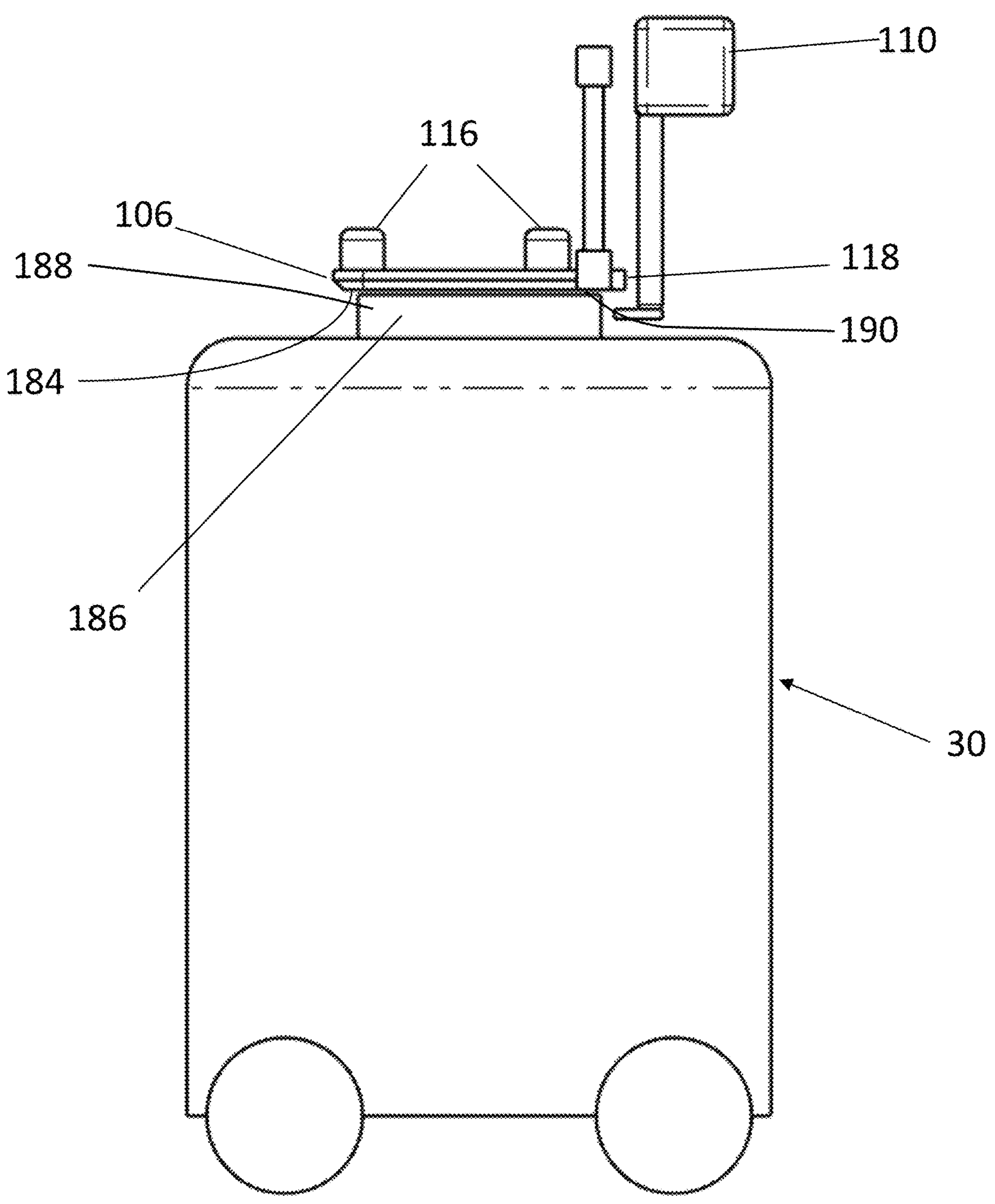
FIG. 16 is a schematic perspective side view of the charge head engaged with the charge collector on the load handling device according to the second embodiment of the present invention.

To disconnect the charge head 184 from the charge collector 186, e.g. once a charging operation has been completed, the platform 106 is raised clear of the charge collector 186. In the particular embodiment of the present invention, the platform 106 is raised by a linear actuator 110. As shown in FIGS. 14 to 16, the linear actuator 110 comprises a shaft 112. The foot or end of the shaft 112 comprise a stop 114 that is arranged to contact or butt up against a bottom wall or underside of the platform 106 as the linear actuator moves in an upward direction to raise the platform 106. Various linear actuators commonly known in the art to lift the platform include but are not limited to mechanical actuators, hydraulic actuators, pneumatic actuators, piezoelectric actuators, or electro-mechanical actuators are applicable in the present invention.

The charge collector 186 comprising the charge-receiving pads comprises a ferromagnetic material, e.g. iron, that is able to magnetically attract to the charge head 184 when the one or more electromagnets are activated or actuated. The one or more electromagnets 116 are activated or actuated in response to a signal from an actuator. In the particular embodiment of the present invention, the actuator is a contact switch 118 that breaks a circuit when the charge head 184 comes into contact with the charge collector 186 to cause the electromagnet to be activated or actuated. For example, the contact switch is formed of two parts that separate to break an electrical circuit and come together to complete the electrical circuit when the charge head disconnects from the charge collector. As shown in FIG. 15, one part of the contact switch 118 is mounted to the platform 106 supporting the one or more of the electromagnetics and the other part is mounted to a linear actuator 112. When the charge head 184 is spaced apart or separated from the charge collector 186 as demonstrated by the schematic view in FIG. 15, the contact switch 118 is closed (i.e. in contact). Conversely, when the charge head 184 comes into contact with or approaches the charge collector 186, e.g. when their corresponding pads contact, the contact switch 118 is open causing a break in the circuit as demonstrated by the schematic view in FIG. 16. The break in the circuit is an indication that the charge head 184 is in contact with the charge collector 186 and causes the electromagnet to be activated or actuated via a suitable controller. The actuator to activate or actuate the electromagnet 116 is not limited to a contact switch and any type of actuator to provide a signal indicative that the charge pads of the charge head 184 is in physical contact with corresponding charge pads of the charge collector 186 and vice versa is applicable in the present invention. For example, one or more sensors, e.g. depth sensors, can be used to provide an indication that the charge head is in contact with corresponding charge pads of the charge collector. Similarly, the length of travel of the linear actuator 110 can be used to determine when the charge head 184 is in contact with corresponding charge pads of the charge collector 186.

The signal from the actuator 118 can be used by a controller to activate or actuate the electromagnet 116 and subsequently control the charging operation. One or more additional contact pads can be mounted to the charge head 184 or the platform 106 supporting the charge head to monitor the status of the rechargeable power source, i.e. to ensure that the charge head supplies the required current based on the condition of the rechargeable power source. As shown in the block diagram in FIG. 17, signals from the actuator 118 are input into a controller 120 and depending on the input signal from the actuator, the controller will activate or actuate the electromagnet to draw the charge head 184 towards the charge collector 186 so that an adequate contact pressure is established between the charge head and the charge collector and subsequently, transfer power from a power source charge (not shown) to charge the rechargeable power source. The charge head and/or the charge collector can be resiliently mounted and biased in the outward direction, e.g. sprung based, to lessen the impact between their respective contact pads but most importantly to control the clamping force under the influence of a magnetic attractive force. In operation when charging a rechargeable power source, the load handling device 30 is instructed to dock at the charge station. For example, a signal is sent from the load handling device to the controller 120 that the load handling device is about to dock at the charge station. Once docked, as indicated by a signal from the load handling device, the controller 120 allows the linear actuator supporting the charge head 184 to lower. For example, a locking mechanism or a stop holding the linear actuator in the raised position is disabled. This allows the platform 106 supporting the charge head 184 to free fall under gravity guided by the guide rods 108 towards the charge collector 186 of the load handling device. As the platform lowers and the charge head 184 remains spaced apart from the charge collector, the actuator remains closed as shown in FIG. 15, i.e. the contact switch is closed. At the point, the charge head 184 contacts the charge collector 186 or their corresponding contact pads contact, the linear actuator 110 continues to drop to cause the contact switch to break or open as shown in FIG. 16. Breakage of the contact switch is an indication that the actuator has been actuated and a signal is sent to the controller 120 to indicate the same. When the actuator is actuated, the controller 120 starts a timer to allow the linear actuator 110 (more specifically the shaft of the linear actuator) to fall for a predetermined amount of time as shown in FIG. 16. The timer prevents the linear actuator crashing into the top wall of the load handling device since the linear actuator is only allowed to fall for a predetermined amount of time and to cause the actuator to be actuated—in the particular embodiment, a break in the contact switch. Alternatively or additionally, the controller can determine the length of travel of the linear actuator and can lower the linear actuator a predetermined length to prevent the linear actuator hitting the top of the load handling device.

Once the actuator has been actuated as determined by the break in the contact switch in the particular embodiment, the controller 120 activates or actuates the one or more electromagnets 116 mounted to the platform 106 supporting the charge head 184 to cause the charge-providing pads of the charge head 184 to be drawn towards the charge-receiving pads of the charge collector 186 by the pull strength of the electromagnetic attractive forces. The charge head 184 is mounted to a resilient member or is sprung loaded so as to compress by the pull strength of the magnetic attractive forces. The resilient member provides the charge head enough give to establish maximum surface area contact between the charge head 184 and the charge collector 186 and thereby, lower the contact resistance as well as to lessen the impact of the charge head 184 making contact with the charge pad of the charge collector 186. A clamping force of the order of 40 N can be established between the contact pads of the charge head 184 and the charge collector 186 necessary to prevent arcing between the contact pads and therefore, prevent degradation of the surface of the contact pads.

Subsequent to a clamping force being established between the charge head 184 and the charge collector 186, more specifically, their respective contact pads, the controller instructs a power transfer unit or power source charger (not shown) to transfer power to the rechargeable power source via the charge head 184. A delay can be built into the system to transfer power to the rechargeable power source once the one or more electromagnets have been activated or actuated. For example, a timer can be used to delay the transfer of power to the rechargeable power source once the electromagnet has been activated or actuated. Once a predetermined amount of time has elapsed as measured by the timer, the controller instructs the power transfer unit to transfer power to the rechargeable power source via the charge head 184. By incorporating a delay between activating the electromagnet and transferring power to the rechargeable power source helps to mitigate arcing so that once a relatively high contact force has been established between the contact pads, power is transferred through the charge head. The high contact pressure which can be in the order to 40N lowers the contact resistance between the charge head and the charge collector.

One or more additional contact pads (not shown) can be mounted to the platform supporting the charge head (mounted to the bottom wall of the platform), to monitor the status of the battery during charging and to ensure that the charge providing pads supply the required current based on the condition of the battery. Once the rechargeable power source is charged or receives the required amount of charge, the controller disconnects the charge head 184 from the charge collector 186. In the particular embodiment of the present invention as shown in FIGS. 14 to 16, the controller instructs the linear actuator 110 to raise and lift the charge head 184, more specifically the moveable platform 106 supporting the charge head 184 clear of the charge collector on the load handling device. Prior to disconnecting the charge head 184 from the charge collector 186, the electromagnets 116 are preferably switched off allowing the linear actuator 110 to freely lift the charge head 184 such that the contact pads of the charge head 184 breaks contact with the charge collector 186. Disconnection of the charge head 184 can, for example, occur once the controller detects that the rechargeable power source is in a charged state or in a fully charged state. In response to detecting that the rechargeable power source is in a fully charged state, the controller de-activates the electromagnet, i.e. switches the current off to the electromagnetic coils, allowing the linear actuator 110 to freely lift the charge head 184 away from the charge collector 186. This allows the linear actuator 110 to lift the charge head 184 mounted to the platform without being drawn to the charge collector 186 as a result of the electromagnetic pull. Disconnection is established when the contact switch re-connects to close the contact switch 118 as the linear actuator 110 is raised. Continuing lifting of the platform 106 raises the charge head 184 further away from the charge collector as shown in FIG. 15. At this point, the charge head 184 is spaced apart from the charge collector 186. Once the charge head is lifted clear of the charge collector, and the contact switch 118 has re-established connection, the load handling device is then free to move away from the charge station. As discussed above with respect to the activation or actuation of the electromagnet, a timer can be used to control the upward travel of the linear actuator and thus, the charge head once the actuator is closed, i.e. when the contact switch is closed.

Figure 17:
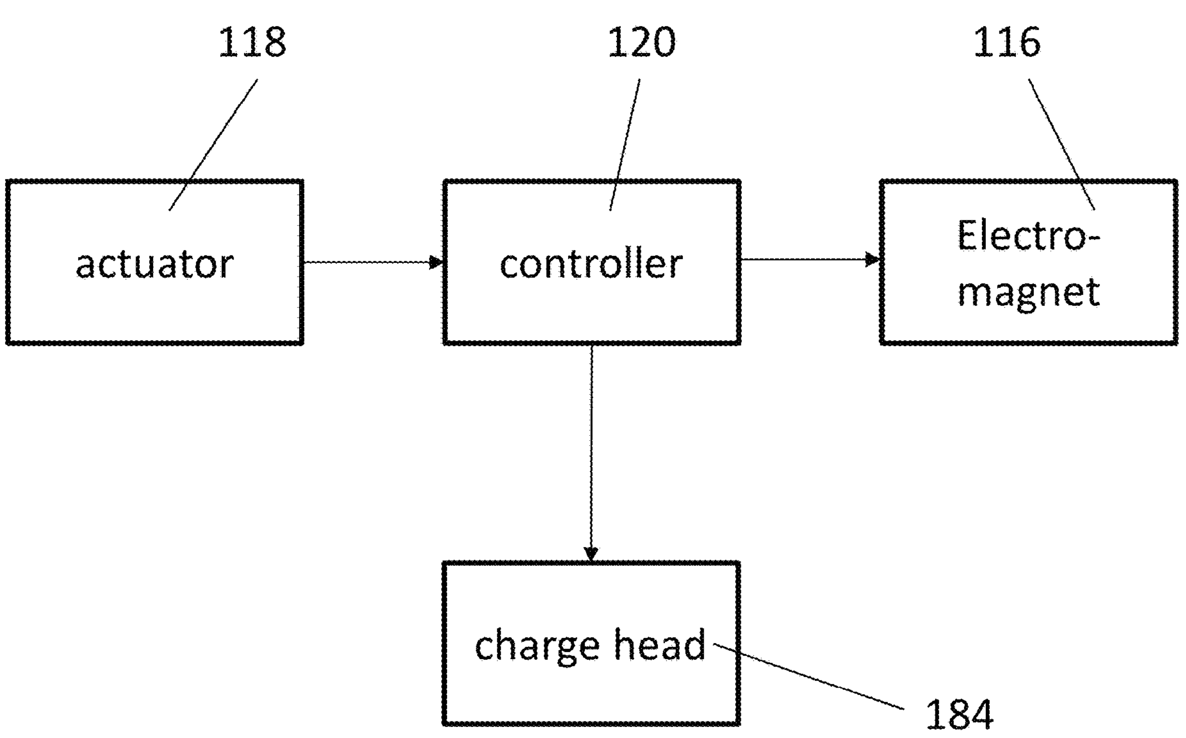
FIG. 17 is a block diagram depicting an example of the charge control system according to the second embodiment of the present invention.

The different operations of the charge contact system according to the second embodiment of the present invention can be summarised in the block diagram shown in FIG. 17. The input signal to the controller 120 is provided by the actuator to indicate the position of the charge head relative to the charge collector. The controller 120 controls the operation of the electromagnet 116 and power to the charge head. In response to a signal from the actuator, i.e. when the contact switch 118 is broken (see FIG. 16), the controller activates or actuates the electromagnet 116 by switching on the current through the solenoid making up the electromagnet. Strong magnetic attractive forces draw the charge head against the charge collector with sufficient pulling force to establish a maximum clamping force. Typically a clamping force of 40N or greater is necessary to prevent arcing and lower the contact resistance between the charge head and the charge collector. Once a sufficient clamping force is established by the pulling force of the electromagnet, the controller switches on the power transfer unit to transfer power to the rechargeable power source via the charge head.

When the rechargeable power source is fully charged, a signal is sent to the controller 120 to deactivate the electromagnet and the linear actuator 110 is actuated to lift the charge head 184 away from the charge collector 186. This causes the contact switch to re-establish connection. A timer can be used to control the lifting of the charge head 184 along the guide 108. For example, the timer can be started to add a predetermined delay once the contact switch 118 is closed so as to allow the charge head 184 mounted to the platform 106 to be lifted clear of the charge collector 186. Alternatively, the controller 120 can determine the length of travel of the charge head 184 along the guide 108 so that the controller 120 can instruct the linear actuator 110 to lift the charge head 184 a predetermined length. Once the contact switch 118 is closed, a signal is sent to the controller 120 indicating that the load handling device is free to move from the charge station.

Different combinations of features of the charge contact system in the first embodiment shown in FIGS. 9 and 10 and the second embodiment shown in FIGS. 14 to 16 can be used without departing from the scope of the present invention as defined in the claims. For example, one or more permanent magnets to pull the charge head into contact with the charge collector in the first embodiment of the present invention as shown in FIGS. 9 and 10 can be replaced by one or more electromagnets so as to allow a controller to activate/actuate the electromagnets as discussed in the second embodiment of the present invention to couple the change head into contact with the charge collector. In both embodiments of the present invention shown in FIGS. 9 and 10 and in FIGS. 14 to 16, the rechargeable power source is optionally housed within the vehicle body 32 (see FIGS. 4 and 5).

The invention claimed is:

1. A storage system comprising:

i) a grid framework structure supporting a pathway arranged in a grid pattern having a plurality of grid spaces or grid cells;

ii) a load handling device configured for lifting and moving containers stacked in the grid framework structure, the load handling device including:

a) a vehicle body housing a driving mechanism operatively arranged for moving the load handling device on the grid framework structure;

b) a lifting device having a lifting drive assembly and a grabber device configured to, in use, releasably grip a container and lift the container from the stack into a container-receiving space;

said driving mechanism and the lifting drive assembly being powered by a rechargeable power source electrically coupled to an electrical charge point arranged on the vehicle body, the electrical charge point including a charge collector; and iii) a charge station including a charge head electrically coupled to a power source charger;

wherein:

the charge head is configured to be connectable with the charge collector to charge the rechargeable power source of the load handling device under action of a magnet an electromagnet, wherein the charge collector and/or the charge head is/are configured to be moveable to electrically couple with each other under action of the electromagnet; and wherein the charge collector and/or the charge head is configured to be extendable from or retractable within an outer housing.

2. The storage system of claim 1, wherein the charge collector comprises:

at least two charge-receiving contact pads arranged to be connectable to at least two charge-providing contact pads of the charge head.

3. The storage system of claim 1, wherein the charge collector and the charge head of the charge station are arranged to electrically couple with each other under action of a magnetic attractive force and electrically disconnect from each other under action of a magnetic repulsive force.

4. The storage system of claim 3, wherein the charge collector and the charge head each comprise:

one or more magnets.

5. The storage system of claim 4, wherein the one or more of the magnets of the charge collector or the charge head comprises:

a rare-earth magnet.

6. The storage system of claim 1, wherein the charge head is mounted to the pathway.

7. The storage system of claim 6, wherein the charge head is mounted to an arm that is configured to be moveable to electrically couple with the charge collector of the load handling device.

8. The storage system of claim 7, wherein the arm is configured to be moveable in response to a signal from a controller.

9. The storage system of claim 1, wherein the electrical charge point is mounted to an exterior surface at least one wall of the vehicle body.

10. The storage system of claim 9, wherein the wall is a sidewall of the vehicle body.

11. The storage system of claim 1, wherein the vehicle body comprises:

a skirt having a first pair of opposite side walls and a second pair of opposite side walls, wherein the electrical charge point is mounted to a bottom edge of at least one of the first and/or second pair of opposite sidewalls.

12. The storage system of claim 1, wherein the electromagnet will be activated when the charge-providing pads of the charge head are in contact with the charge-receiving pads of the charge collector.

13. The storage system of claim 12, wherein the electromagnet is activated by an actuator.

14. The storage system of claim 13, wherein the actuator is a contact switch.

15. The storage system of claim 1, comprising:

a controller configured to be operable to supply current to charge the rechargeable power source in response to the electromagnet being activated.

16. The storage system of claim 1, wherein the charge head is moveable to the second position under action of gravity to contact the charge collector.

17. The storage system of claim 1, wherein the charge head is configured and arranged to be raised to the first position by a linear actuator to disengage the charge head from the charge collector of the load handling device.

18. The storage system of claim 17, wherein the electromagnet will be activated when the linear actuator has extended a predetermined length.

19. The storage system of claim 1, wherein the charge head is configured and arranged to be moveable among a first position wherein the charge head will be spaced apart from the charge collector and a second position wherein the charge head will be in physical contact with the charge collector.

20. The storage system of claim 19, wherein the charge head is guided in a vertical direction by at least one guide member.

21. A method of charging a rechargeable power source of a load handling device in a storage system, the method comprising:

providing the storage system comprising:

a grid framework structure supporting a pathway arranged in a grid pattern having a plurality of grid spaces or grid cells;

the load handling device being configured for lifting and moving containers stacked in the grid framework structure including:

a vehicle body housing a driving mechanism operatively arranged for moving the load handling device on the grid framework structure; and a lifting device having a lifting drive assembly and a grabber device configured to, in use, releasably grip a container and lift the container from a stack of containers into a container-receiving space, said driving mechanism and the lifting drive assembly being powered by the rechargeable power source electrically coupled to an electrical charge point arranged on the vehicle body, the electrical charge point including a charge collector; and a charge station including a charge head electrically coupled to a power source charger, wherein the charge head is configured to be connectable with the charge collector to charge the rechargeable power source of the load handling device under action of an electromagnet;

a) lowering the charge head towards the charge collector of the electrical charge point;

b) activating the electromagnet to pull and/or push the charge head towards the charge collector under a magnetic attractive force, wherein the charge collector and/or the charge head is/are configured to be moveable to electrically couple with each other under action of the electromagnet; and c) supplying current to the rechargeable power source via the charge head, wherein the charge collector and/or the charge head is configured to be extendable from or retractable within an outer housing.

22. The method of claim 21, comprising:

d) activating the electromagnet in response to detecting a signal from an actuator.

* * * * *